United States Patent [19]

Howarth et al.

[11] Patent Number: 5,385,650
[45] Date of Patent: Jan. 31, 1995

[54] RECOVERY OF BROMINE AND PREPARATION OF HYPOBROMOUS ACID FROM BROMIDE SOLUTION

[75] Inventors: Jonathan N. Howarth; Ahmad Dadgar, both of Lafayette; Rodney H. Sergent, W. Lafayette, all of Ind.

[73] Assignee: Great Lakes Chemical Corporation, West Lafayette, Ind.

[21] Appl. No.: 56,858

[22] Filed: Apr. 30, 1993

Related U.S. Application Data

[63] Continuation-in-part of Ser. No. 791,049, Nov. 12, 1991, abandoned.

[51] Int. Cl.⁶ .................. C25B 1/22; C25B 1/24
[52] U.S. Cl. .................. 204/103; 204/101; 204/128; 210/748; 423/500
[58] Field of Search .................. 204/98, 128, 129, 130, 204/149, 265, 266, 277, 278, 284, 283, 290–291, 101, 103; 210/748; 423/500

[56] References Cited

U.S. PATENT DOCUMENTS

| | | | |
|---|---|---|---|
| 2,825,685 | 3/1958 | Schachter et al. | 204/128 |
| 2,882,210 | 4/1959 | Jenks | 204/151 |
| 3,305,472 | 2/1967 | Oldershaw et al. | 204/268 |
| 3,873,438 | 3/1975 | Anderson et al. | 204/268 |
| 4,046,655 | 9/1977 | Itai et al. | 204/130 |
| 4,085,028 | 4/1978 | McCallum | 204/269 |
| 4,203,814 | 5/1980 | Grantham | 204/129 |
| 4,251,335 | 2/1981 | Bergner et al. | 204/128 |
| 4,279,712 | 7/1981 | Satoh et al. | 204/128 |
| 4,294,671 | 10/1981 | Balko | 204/128 |
| 4,311,568 | 1/1982 | Balko | 204/128 |
| 4,548,694 | 10/1985 | Miles | 204/98 |
| 4,714,534 | 12/1987 | Fair et al. | 204/269 |
| 4,725,425 | 2/1988 | Lesher et al. | 423/504 |
| 4,734,170 | 3/1988 | Oda et al. | 204/98 |
| 4,772,364 | 9/1988 | Dempsey et al. | 204/98 |

FOREIGN PATENT DOCUMENTS

| | | |
|---|---|---|
| 1195949 | 10/1981 | Canada . |
| 0016290 | 10/1980 | European Pat. Off. . |
| 10390 | 6/1958 | Israel . |

OTHER PUBLICATIONS

Schuetz et al., Electrolysis of Hydrobromic Acid, Int'l J. Hydrogen Energy, vol. 5, pp. 305–316, 1980, Great Britain.

A. Dadgar, Refractory Concentrate Gold Leaching: Cyanide vs. Bromine, Journal of the Minerals Metals & Materials Society, Reprinted from JOM, vol. 41, No. 12, Dec., 1989, pp. 37–41.

J. Howarth et al., Electrochemical Regeneration of Bromine in a Gold Leach/Recovery Circuit, EPD Congress '91, TMS Annual Meeting, Feb. 17–21, 1991, New Orleans, La.

J. Howarth et al., Some Modern Applications of Bromide Ion Electrolysis, Fifth International Forum on Electrolysis, Fort Lauderdale, Fla., Nov. 10–14, 1991.

(List continued on next page.)

*Primary Examiner*—Kathryn Gorgos
*Attorney, Agent, or Firm*—Senniger, Powers, Leavitt & Roedel

[57] ABSTRACT

A process for recovering bromine from an acidic solution containing bromide ion. Electric current is passed through the acidic solution between an anode and a cathode, thereby generating bromine by electrolysis at the anode to produce an electrolyzate containing bromine. Bromine is separated from the electrolyzate as a vapor under negative pressure. The bromide ion solution may be contaminated with organic material. An electrolytic process for producing a hypobromous acid solution. An electrolytic cell.

29 Claims, 8 Drawing Sheets

OTHER PUBLICATIONS

A. Dadger et al., Gold Leaching and Recovery: The Bromide Process, Third International Symposium on Electrochemistry in Mineral and Metal Processing Annual Meeting of the Electrochemical Society, St. Louis, Mo., May 17–22, 1992.

Caprioglio et al., The ISPRA Mark 13A Flue Gas Desulfurization Process Design Status and By-Products Utilization, ERRI/EPA $SO_2$ Control Symposium, 1990, New Orleans.

Feess et al., The Influence of Noble Metal Catalysts On The Electro-Chemical Decomposition Of Concentrated Hydrobromic Acid At Graphite Electrodes, Int'l J. Hydrogen Energy, vol. 6, No. 4, pp. 377–388, 1981, Great Britain.

Schuetz et al., Electrolysis Of Hydrobromic Acid, Int'l J. Hydrogen Energy, vol. 5, pp. 305–316, 1980, Great Britain.

Cettou et al., On the Electrolysis Of Aqueous Bromine Solutions To Bromate, Electrochimica Acta, vol. 29, No. 7, pp. 875–885, 1984, Great Britain.

Krystek et al., (Abstract) CA94(20): 164712a, Regeneration of Bromine from Waste HBr Formed in the Production of Extinguishing Halon, Przem. Chem., 59(11–12), 628–30, 1980, Poland.

Dotson et al., Electrosynthesis With Perfluorinated Ionomer Membranes In Chlor-Alkali Cells, Amer. Chem. Soc., 1982.

Velzen et al., "HBr Electrolysis In the Ispra Mark 13A Flue Gas Desulphurization Process: Electrolysis In a DEM Cell", Journal Of Applied Electrochemistry, vol. 20, 1990, pp. 60–68.

Kastner, (Abstract), CA69(2): 7877z, Electrolytic Production of Bromine: French Pat. 1,493,735, Sep. 1, 1967.

Kosaka et al., (Abstract), CA93(10): 103852d, Electrochemical Production of Sodium Bromate; Japan Pat. 55-044531, Sep. 25, 1978.

RECOVERY OF BROMINE AND PREPARATION OF HYPOBROMOUS ACID FROM BROMIDE SOLUTION

This application is a continuation-in-part of application Ser. No. 791,049 filed Nov. 12, 1991 now abandoned.

BACKGROUND OF THE INVENTION

This invention relates to the recovery of bromine from bromide ion solutions, and more particularly, to an electrolytic process for the recovery of bromine from alkali metal bromide and hydrobromic acid solutions and to the recovery of bromine from such solutions which are contaminated with organic material. The invention also relates to the electrolysis of mixed halide solutions and to the production of hypobromous acid solutions from mixed halide solutions.

Bromine and bromine releasing compositions have been demonstrated to be useful for numerous industrial and consumer applications. These applications include disinfection and other biological control in connection with recirculating cooling water, waste water, pond and lagoon water, bleaching, irrigation, metal extraction, and swimming pools, among others. Other applications include use of bromine in a manner unrelated to its capacity for disinfection/biocontrol, such as in the manufacture of brominated organic compounds.

In the manufacture of brominated organic compounds, molecular bromine reacts with an organic substrate to produce HBr as a by-product:

$$RH + Br_2 \rightarrow RBr + HBr$$

where R is an organic functional group. The HBr by-product may be absorbed in an aqueous medium to produce hydrobromic acid solution. Alternatively, the HBr by-product may be absorbed in sodium hydroxide solution to produce an alkaline by-product solution of sodium bromide.

Organic bromine compounds are commonly used as intermediates in the manufacture of other organic products. For example, an organic bromide can be reacted in an aqueous medium with a nucleophile which displaces the bromide to produce an organic compound substituted with the nucleophile, plus $Br^-$ as a by-product. For example:

$$RBr + M^+ + Nu^- \rightarrow RNu + M^+ + Br^-$$

where $Nu^-$ is a nucleophilic anion and $M^+$ is either an alkali metal ion or hydrogen ion. By-product alkali metal bromide solutions of the nucleophilic substitution are commonly contaminated with significant amounts of organic materials, typically in proportions of over 1000 ppm. Hydrobromic acid and sodium bromide solutions obtained in recovering HBr from organic bromination operations may be similarly contaminated. Unless such by-product streams can be further processed to separate the organic materials from the bromide ion, the latter is entirely wasted, resulting in an unfavorably high consumption of bromine and bromine sources in the manufacture of the RNu product.

The bromide content of many organic bromination or nucleophilic substitution waste streams represents a substantial economic value if recovered as molecular bromine. In any case, increasingly restrictive regulation of chemical waste effluents makes recovery of many materials a necessity, regardless of economic return.

Conventionally, bromine is produced in the first instance by chlorine oxidation, i.e., by contacting a bromide ion solution with chlorine gas. This reaction is normally carried out in a packed tower in which an alkali metal bromide brine is contacted with chlorine and steam. The chlorine reacts with the bromide ion to produce molecular bromine and by-product chloride ion:

$$2Br^- + Cl_2 \rightarrow Br_2 + 2Cl^-$$

A mixture of $Br_2$, $Cl_2$, and steam exits the top of the tower and is cooled to condense $Br_2$. Chlorine oxidation technology can also be brought to bear on the recovery of molecular bromine from bromide ion-containing waste streams. However, this process consumes chlorine and produces a waste solution containing substantial amounts of by-product chloride ion. Moreover, certain by-product streams contain high molecular weight organic residues that may tend to plug the chlorine oxidation tower.

SUMMARY OF THE INVENTION

Among the several objects of the present invention, therefore, may be noted the provision of an improved process for the recovery of bromine from acidic alkali metal bromide and hydrobromic acid solutions; the provision of a process for recovery of bromine from solutions having a wide range of bromide ion content; the provision of a process which is effective for the recovery of bromine from bromide solutions contaminated with organic materials; the provision of a process for the recovery of bromine from bromide solutions produced as a by-product of organic brominations or the reaction of organic bromides with nucleophiles; the provision of such processes which can be conducted effectively and economically to recover bromine from bromide-containing by-product or waste streams of large or small volume; the provision of such a process which provides economical generation of bromine from bromide ion solutions that are uncontaminated with organic materials; the provision of a process for producing hypobromous acid solution; the provision of a process for producing bromine for use in water treatment and chemical reaction systems requiring bromine; and the provision of an electrolytic cell for producing bromine.

Briefly, therefore, the invention is directed to a process for recovering bromine from an acidic solution containing bromide ion. In the process, an electric current is passed through the solution between an anode in contact with the solution and a cathode in electrical communication with the solution, thereby generating bromine by electrolysis of the solution at the anode to produce an electrolyzate containing bromine. Bromine is separated from the electrolyzate as a vapor under negative pressure.

Another aspect of this invention is a bromine recovery process in which bromine is separated from an electrolyzate containing bromine by sparging a gas through the electrolyzate at a positive pressure of less than about 90 psi. The bromine is introduced under positive pressure directly into a chemical reaction system requiring bromine.

Also included in the invention is a process for the recovery of bromine from a solution containing bromide ion in which an electric current is passed through the solution between an anode and a cathode in a divided electrolytic cell that contains a cation exchange membrane positioned between the anode and cathode. The membrane divides the cell into an anode chamber containing the anode and a cathode chamber containing the cathode, the anode chamber containing the bromide ion solution in contact with the anode. Bromine is generated in the bromide ion solution at the anode to produce an anolyte product containing bromine, and hydrogen is generated at said cathode. Bromine is separated from the anolyte product under negative pressure.

A further aspect of the invention is a process for the recovery of bromine from a solution containing bromide ion and contaminated with organic material. In the process, electric current is passed through the solution between an anode in contact with the solution and a cathode in electrical communication with the solution. Bromine is generated by electrolysis of the solution at the anode to produce an electrolyzate containing bromine. Bromine is separated as a vapor from the electrolyzate.

The invention is still further directed to a process for preparing a solution containing at least about 0.05M HOBr from a feed solution containing bromide ion. Electric current is passed through the feed solution between an anode and a cathode of an electrolytic cell which are in electrical communication with the solution. Bromine is generated by electrolysis of the solution at the anode to produce an electrolyzate containing bromine. The bromine reacts with water in the electrolyzate to produce a solution containing at least about 0.05M HOBr.

A final aspect of the invention is an electrolytic cell. The cell includes a frame which has a plate having a recess in a first face thereof for receiving a sheet electrode. There are inlet and outlet channels in the plate open to the face of the plate opposite the first face. An aperture in the plate in the area of the recess accommodates a conductor for transmission of current to or from the cell. There is a means for fluid flow communication between the inlet channel and a portion of the recess comprising the recess inlet and means for fluid flow communication between the outlet channel and a portion of the recess comprising the recess outlet. The channels otherwise are not in communication with the first face of the plate. The recess outlet is remote from the recess inlet to define a path for flow of electrolytic solution through said cell. The cell also includes a sheet electrode received in the recess, the face of the sheet electrode includes means therein for flow of an electrolytic solution along the electrode face from the recess inlet to the recess outlet. The electrode is electrically connected to the conductor. There is also a nonconductive liner between the electrode sheet and the surface of the recess, the edge of the liner being spaced from the edge of the recess in the regions of the recess inlet and recess outlet to permit flow of electrolytic solution to the electrode from the recess inlet and from the electrode to the recess outlet. The liner has an aperture therein aligned with the aperture in the plate to accommodate the conductor.

BRIEF DESCRIPTION OF THE DRAWINGS

Corresponding reference characters represent corresponding parts in the several views.

DETAILED DESCRIPTION OF THE INVENTION

Figure 1:
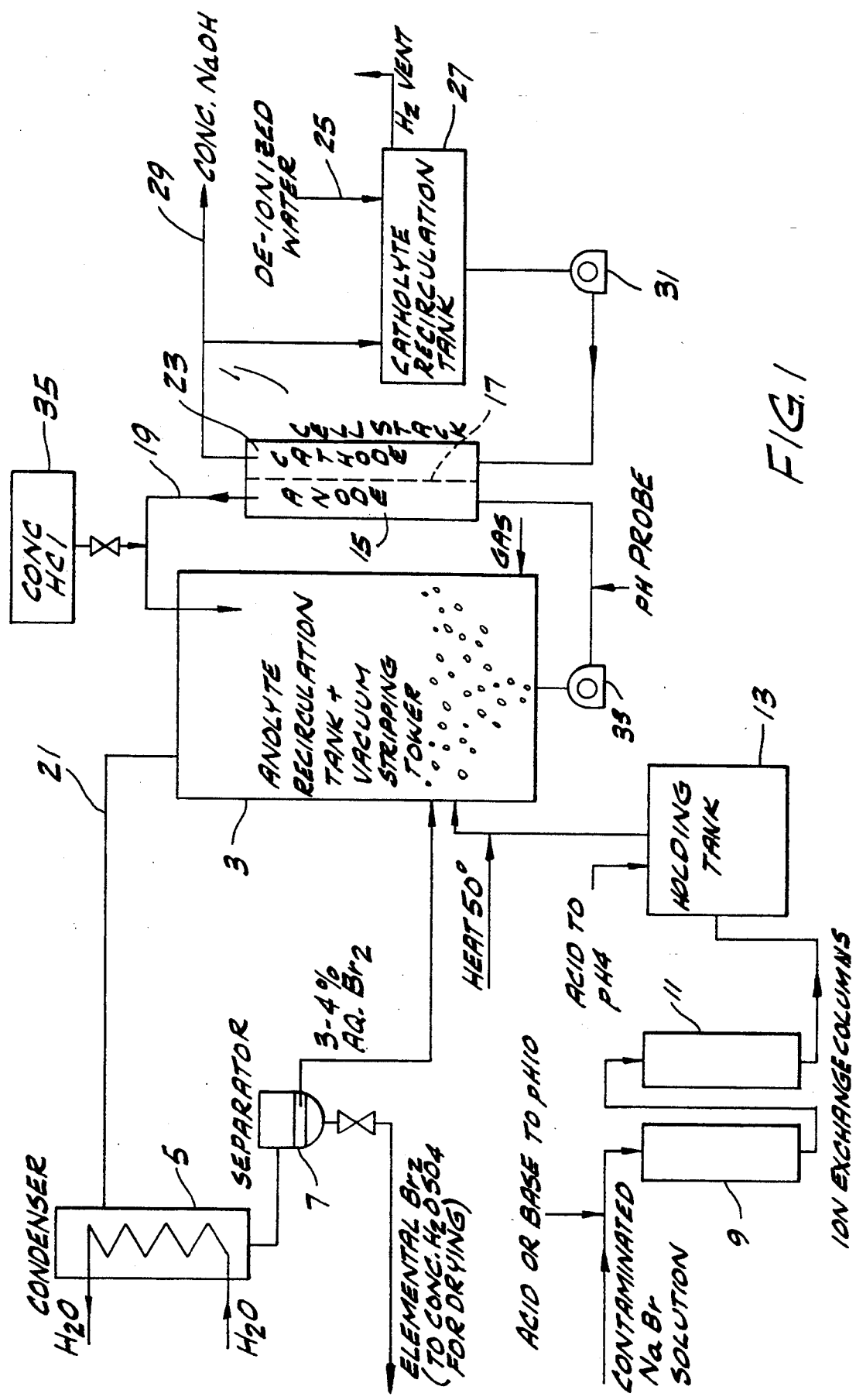
FIG. 1 is a schematic flow sheet of a preferred process of the invention.

In accordance with the invention, an effective and efficient electrolytic process has been discovered for the recovery of molecular bromine either from sources of bromide ion that are free of organic contaminants or from the by-product streams of organic brominations. More particularly, a process has been devised which is effective for recovering molecular bromine from waste stream bromide solutions that are contaminated with organic materials, such as waste streams obtained in the nucleophilic displacement of bromide from organic bromides. For generation of bromine from either contaminated or uncontaminated sources, the process of the invention offers significant advantages over the alternative of chlorine oxidation. Electrolytic recovery of bromine does not simply produce an equivalent volume of chloride ion in the depleted brine. Instead, a high yield of bromine can be realized without consumption of other halogens.

Where organic contaminants are present, at least some of these may be eliminated by oxidation in the anode compartment of the electrolytic cell, and the remainder may be purged in a relatively concentrated waste stream that contains only a minor proportion of the bromide ion that enters the electrolytic process as a waste stream from the organic synthesis operation. Certain problems likely to arise in the chlorine oxidation process, such as plugging of the bromine tower with non-volatile organic residues, are entirely avoided. Moreover, the process of the invention may be operated to produce a sodium hydroxide solution at the cell cathode which is entirely free of organic contamination, as well as hydrogen, which may be useful as a boiler fuel supplement, in collateral hydrogenation reactions, or as a product of commerce.

In certain embodiments, the process of the invention combines certain features of merchant chlor-alkali production technology into the electrolysis of organic bromination waste streams, or other streams of modest bromide ion content. The commercial production of chlorine differs in numerous respects from the recovery of bromine from the by-product stream of an organic bromination. Differences prevail, for example, in halide concentration, solution conductivity, solution chemistry, solubility relationships, and phase equilibria. Although dimensionally stable anodes have been used for the production of $Br_2$ or sodium bromate, the prior art generally has not utilized the same types of cell constructions for bromine generation as it has for chlorine production. Yet applicants have discovered that bromine can be recovered most advantageously and economically from the by-product streams of organic brominations by utilizing undivided cells or divided cells which combine the chlorine production cell design features of dimensionally stable anodes and cation exchange membrane cell dividers.

Applicants have further discovered that the ultimate recovery of molecular bromine from the electrolytic product is enhanced by operation at relatively low temperature under vacuum. Low temperature operation reduces the amount of water that is stripped off with the bromine, and consequently reduces the proportion of molecular bromine that condenses as bromine water, requiring further separation. For similar reasons, vacuum stripping of bromine is more efficient than stripping with steam, as in the conventional chlorine oxidation process, or any other process in which bromine is stripped at elevated temperature under positive pressure.

In one preferred embodiment of this invention, bromine is recovered using undivided electrolytic cells, i.e., cells containing no diaphragm or other impediment or obstruction to flow of electrolytic solution sufficient to cause a discontinuity in the concentration gradient between the anode and the cathode. The undivided cell electrogeneration system may comprise a cell bank containing a plurality of cells.

A variety of bromide ion feed solutions may be processed by undivided cell electrolysis. These solutions include acidic alkali metal bromide solutions and hydrobromic acid solutions. Such solutions may be, for example, bromide solutions that are derived from absorption of HBr off-gas from organic brominations or from nucleophilic substitutions of organic bromides and thus are contaminated with organic residues from the brominations or nucleophilic substitutions; bromide solutions uncontaminated with such residues; and bromide solutions substantially uncontaminated with any organic material.

Figure 4:
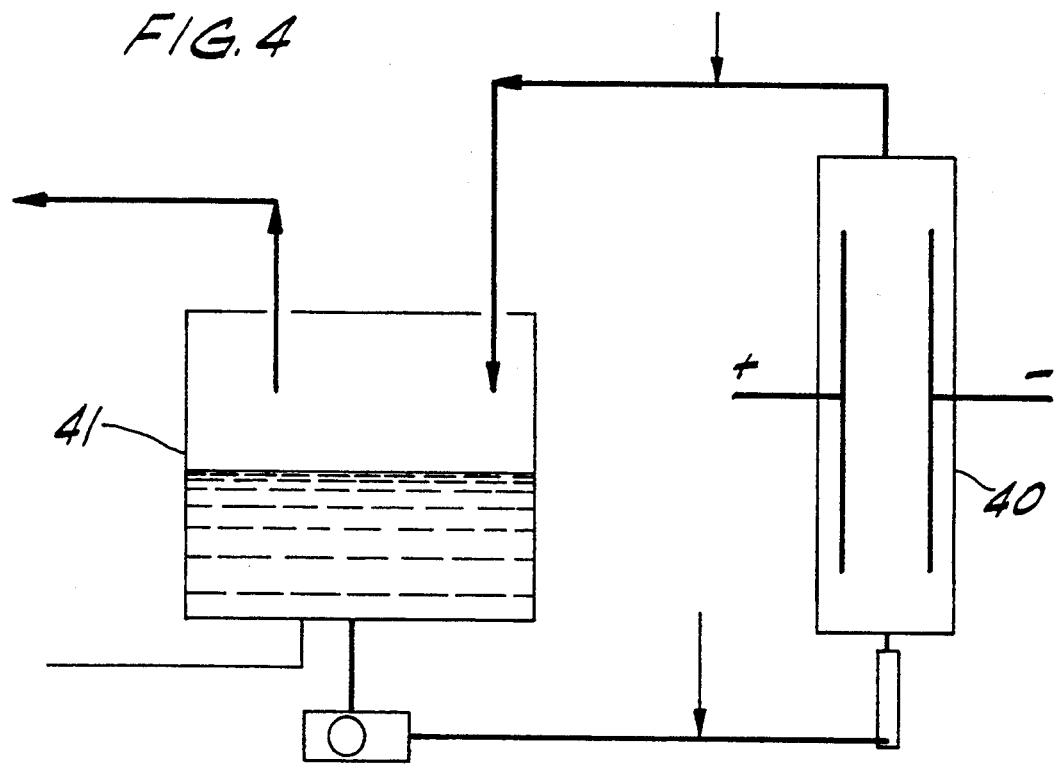
FIG. 4 is a schematic flow sheet of a preferred process of the invention.

Undivided-cell electrogeneration in accordance with this invention is operated in a batch mode, in a recirculating batch mode, in a recirculating continuous mode, or in a once-through mode, depending on the particular application. When operated in a once-through mode, a source of bromide ions is fed into the electrolytic cell and no portion of the electrolyzate leaving the cell is recirculated to the cell. Illustrated in FIG. 4 is a schematic flowsheet of the undivided-cell electrogeneration system of the invention as operated in a recirculating mode. A solution continuously recirculates between the electrolytic cell 40 and the recirculation vessel 41. If there is no source of bromide ion replenishment, the system operates in a batch mode. By continual or intermittent replenishment of the source of bromide ions to the recirculating solution, the system may be operated in a continuous mode.

A bromide ion feed solution flows into the undivided cell and is in direct electrical communication with the anode and cathode. Power is applied to the cell by a direct current power source via an anode and a cathode. Bromine is generated by the reaction:

$$2Br^- \rightarrow Br_2 + 2e^-;$$

thereby producing an electrolyzate containing bromine. Hydrogen is generated at the cathode by the reaction:

$$2H^+ + 2e^- \rightarrow H_2.$$

In a recirculating batch system, electrolysis is preferably continued to a conversion of at least about 90%, preferably to between about 95% and about 98%, of $Br^-$ in the initial charge of solution. The undivided-cell electrolysis of the invention is effective for recovery of bromine from hydrobromic acid solutions, alkali metal bromide solutions, and a wide variety of bromide ion solutions of low pH. Broadly, the initial composition of the feed to the electrolytic cell may contain between about 5% and about 35%, preferably between about 8% and about 25%, by weight bromide ion, and have a pH of between about 2 and about 6. Lower pH will generally prevail where the electrolyte is HBr as compared to alkali metal bromide. This process is especially advantageous for the recovery of bromine from organic contaminated bromide ion waste streams containing, for example, up to about 10% by weight organic material, such as those generated in the nucleophilic substitution of organic bromide compounds. Alkali metal bromide compositions of the latter type typically contain between about 5% and about 35% by weight bromide ion and between about 0.2% and about 10% by weight organic materials, and have a pH of between about 1 and about 14. Hydrobromic acid solutions derived from such sources typically contain between about 5% and about 47.5% by weight bromide. Also useful as feed materials in the process of the invention are alkali metal bromide solutions obtained from absorption in sodium hydroxide absorption of the HBr off gas from organic brominations. Such compositions are typically alkaline, and may contain between about 7% and about 46% by weight NaBr and between about 1% and about 5% by weight NaOH. As noted above, such compositions are acidified to pH 2 and about 6, preferably about 3 to 4 before introduction into the electrolytic cell.

The cell is preferably operated at an anode current density of between about 1 and about 4 kA m$^{-2}$, more preferably between about 1.5 and about 2.5 kA m$^{-2}$, and a temperature of between about 20° C. and about 80° C., more preferably between about 35° C. and about 65° C. Operation under these conditions generally requires a cell voltage of between about 1.8 and about 4, depending on the initial concentration of bromide ion, the concentration of other electrolytes in the bromide ion feed solution, the electrode spacing, the degree of bromide ion conversion, and the current density. Anode current efficiencies achieved by this process are typically in the range of about 65% to about 90%.

After electrolysis, the electrolyzate is caused to flow out of the cell. When operated on a continuous basis whereby bromide ions in the feed solution are continuously or intermittently replenished, the composition of the electrolyzate flowing out of the cell will attain substantially steady state conditions. When the cell is operated continuously, the electrolyzate flowing out of the cell contains between about 0.5% and about 10%, preferably between about 4% and about 6%, by weight equivalent molecular bromine and between about 45% and about 1%, preferably between about 5% and about 2%, by weight bromide ion, and exhibits a pH between about 2 and about 6, preferably between about 3 and about 4. Equivalent molecular bromine is defined in molar terms as the sum of the actual molar concentration of molecular bromine, the molar concentration of perbromide ion, the molar concentration of hypobromous acid, and the molar concentration of hypobromite ion.

When operated on a recirculating batch basis, composition of the electrolyzate flowing out of the cell changes as the reaction progresses. The electrolyzate flowing out of the cell contains between about 0.5% and about 10% by weight equivalent molecular bromine and between about 45%, and about 1% by weight bromide ion, and exhibits a pH between about 2 and about 6.

So that the pH of the system remains in the range of about 2 to 6, the OH$^-$ produced as a result of cathodic reduction of water is neutralized by continuous or intermittent addition of an acid, for example, 6M HCl or 9M HBr, to the electrolyzate. Control of pH serves to prevent formation of bromate in the electrolyzate. This may be accomplished, for example, by introduction of acid to the electrolyzate immediately after it leaves the cell, as shown in FIG. 4. A pH probe may be used to control delivery of the acid. In general, continuous or intermittent acid addition is essential for continuous systems where acid is continually withdrawn from the systems with the product; for batch systems acid addition is necessary if the pH of the system otherwise rises above about 6.

Hydrogen generated at the cathode may be vented to the atmosphere or recovered for use as a boiler fuel supplement, in hydrogenation reactions, or as a product of commerce. Before use, the hydrogen may be cooled, dried and purified in accordance with methods well known in the art.

The bromine generated at the anode may be continuously removed from the electrolyzate. Continuous withdrawal prevents the build-up of bromine product as perbromide in solution. The electrolyzate withdrawn from the cell is charged to recirculation vessel 41 which serves as a stripper pot, and recovered under negative pressure. In the stripper pot, the liquid mixture is heated to at least about 45° C., but not greater than about 95° C. In order to minimize vaporization of water and organic contaminants, the liquid mixture is preferably heated to not greater than about 60° C., most preferably to about 45° C. to about 55° C. The degree of recovery of bromine liquid per stripper batch, as a percentage of equivalent molecular bromine in the electrolyzate, is significantly influenced by the temperature at which stripping is conducted. The higher the pot temperature, the greater the fraction of water vapor in the vapor stream.

A vacuum is applied to the stripper between about. 2 and about 24 in Hg vacuum. To aid in the stripping process, air or inert gas, preferably nitrogen may be sparged into the solution in the stripper. In continuous stripping, the equivalent molecular bromine concentration at the discharge of the column is between about 0.12% and about 1.0%, preferably between about 0.2% and about 0.8%, by weight. Bromine vapor and a modest amount of water vapor are removed from the liquid phase during stripping. The vapor stream is condensed in condenser 5 at a temperature of about 5° to 20° C. under essentially the same pressure as the head of the stripper.

In addition to the benefit in $Br_2$ recovery, operation of the stripper under vacuum provides safety, energy savings, and environmental benefits. Maintenance of negative pressure in the vapor streams insures against leaks of bromine gas to the surroundings. Liquid drained from the condenser is pumped to storage under positive pressure. However, control of leaks in the liquid phase system is generally more manageable than control of leaks through an entire positive pressure system.

Bromine-laden vapor leaving the recirculation vessel may be condensed to produce a liquid bromine product stream. Since essentially all the water vapor must be condensed in the course of condensing the bromine vapor, and because the water phase is essentially saturated with bromine, a high water content of the stripper vapor results in partitioning a significant portion of the elemental bromine to the water phase and consequent recycle to the stripper pot. By operating the stripping column under vacuum at a low temperature, the process of the invention provides a vapor stream with a minimal water content, resulting a high yield of bromine liquid. Such conditions may also tend to inhibit the formation with a sludge or residue from the organic contaminants.

Figure 9:
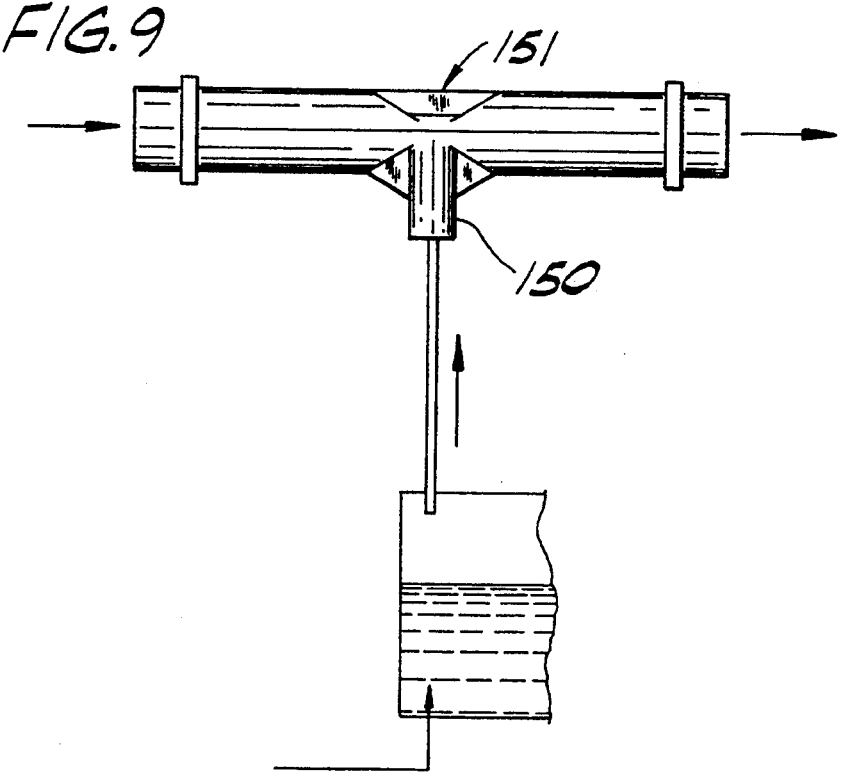
FIG. 9 is a schematic flow sheet of a preferred process of the invention.

In an alternative embodiment of this invention, bromine-laden vapor removed from the electrolytic product stream is not condensed, but is introduced directly into a water system such as a cooling tower, swimming pool or wastewater stream, where the bromine is used for disinfection, algae control or odor control. The $Br_2$ stripped under negative pressure may be introduced into the bromination zone by drawing the system vacuum on the bromination zone or by compressing the $Br_2$ in the ejector or other means for imposing a vacuum on the stripper. FIG. 9 is an illustration of the use of bromine vapor for water treatment. In particular, bromine vapor is separated from the electrolyzate under negative pressure, preferably such that the vacuum applied above the electrolyzate is between about 2 and 24 in. Hg vacuum, and directed to the inlet 150 of an eductor 151 through which flows the aqueous stream to be treated. The eductor serves to establish the requisite vacuum above the electrolyzate, and both compress the $Br_2$ and mix it with the water. A suitable eductor for this purpose includes a differential pressure injector such as those available from Mazzei Injector Corporation.

Figure 10:
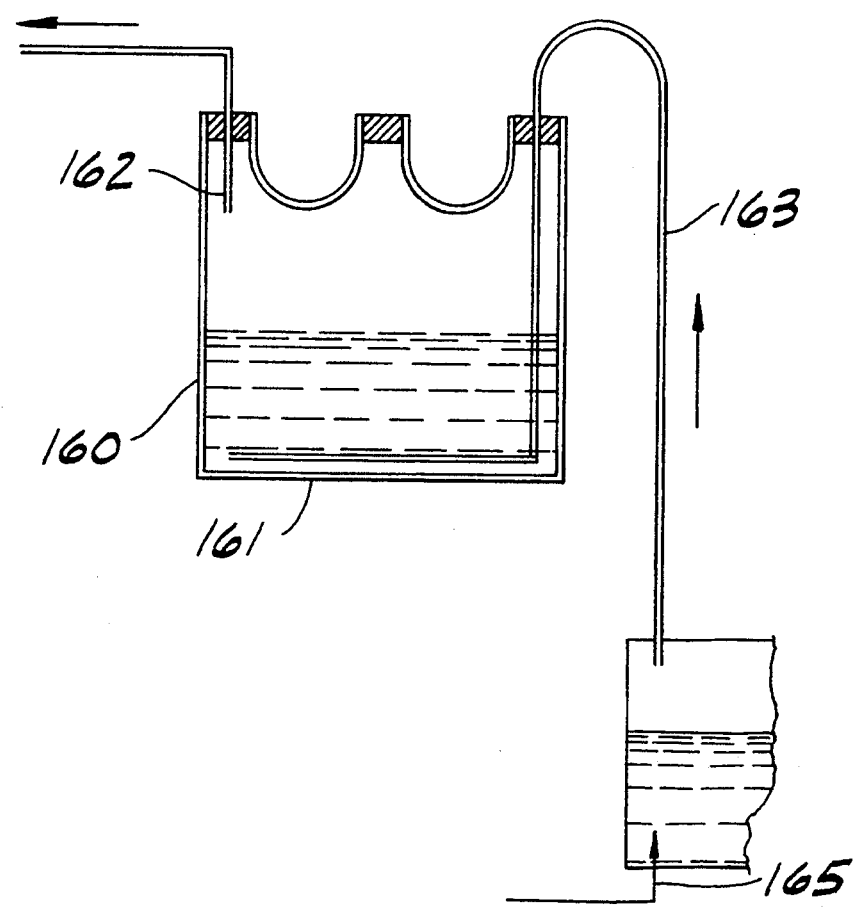
FIG. 10 is a schematic flow sheet of a preferred process of the invention.

In a still further embodiment, the bromine-laden vapor is not condensed but is directed to a reaction vessel requiring bromine, such as an organic bromination reaction vessel. Use of the bromine-laden vapor in this manner is especially useful for the production of brominated organic compounds such as brominated fire retardants. FIG. 10 is an illustration of one particularly preferred embodiment of the use of bromine vapor in an organic bromination reaction in this manner. The bromine vapor is separated from the electrolyzate under negative pressure. The purging of gas through the recirculation vessel assists in separation and transportation of the bromine vapor. The bromine vapor is directed to the reaction vessel 160 and introduced into the reaction medium using a frit 161 to assist dispersing the bromine vapor. The bromine vapor is stripped or scrubbed through the reaction medium by application of a vacuum, at the top of the reaction vessel as shown at 162. The vacuum applied above the reaction medium is such that preferably between about 2 and 24 in. Hg vacuum is applied to the top of the liquid in the recirculation vessel. The vacuum applied to the reaction vessel is great enough to provide the desired negative pressure above the electrolyzate while accounting for the pressure drop through the liquid in the reaction vessel. In one preferred embodiment, 29.9 in. Hg vacuum is applied to the top of the bromination vessel. The depth of liquid in the vessel is maintained between about 6 inches and 12 feet. Due to the pressure drop through the liquid and through the conduit 163, the resulting vacuum applied to the top of the recirculating vessel is in the range of about 29 in. Hg vacuum to about 19 in. Hg vacuum, depending on the depth of liquid in the reaction vessel. The vacuum applied to the top of the reaction vessel can be adjusted to provide the desired vacuum to the top of the recirculation vessel. In one preferred embodiment, the bromine vapor is stripped through a quantity of a mixture of bisphenol-A and a solvent. Upon contact of the bromine with the mixture, the organic bromination reaction to form tetrabromobisphenol-A is initiated.

As an alternative to using a vacuum in connection with the process shown schematically in FIG. 10, the bromine may be removed from the electrolyzate and carried to the reaction vessel using positive pressure by sparging air under pressure into the recirculation vessel at inlet 165. In one embodiment, air is introduced under a positive pressure of less than about 90 psi, preferably less than about 50 psi, and more preferably about 35 psi. Where there is about 12 feet liquid depth in the recirculation vessel, the resulting pressure at the top of the recirculation vessel is about 30 psi, due to a loss of about 5 psi pressure through the liquid depth. Typically, the pressure loss through the liquid depth in the recirculation vessel will be from about 1 to 5 psi. An additional pressure loss of about 1 to 5 psi can be expected in the reaction vessel.

As a feature of the undivided-cell electrolytic process of the invention, in the early stages of electrolysis, the apparent current efficiency, as measured by $Br_2$ vapor generation, is depressed (for example, to 65%) but rises as the reaction proceeds. This trend is contrary to other electrolytic processes in which there is normally a drop in current efficiency over time. Although we do not wish to be bound to a particular theory, it is believed that this trend can be attributed to unique solution equilibria of bromine. The $Br_2/Br^-/Br_3^-$ equilibrium constant for the relevant reaction:

$$Br_2 + Br^- = Br_3^-$$

is relatively high. Early in the electrolysis, the bromide ion concentration is high, and the equilibrium is displaced to the right. Perbromide ion is non-volatile and accumulates in solution. Accordingly, a significant portion of the electrolytically produced bromine is not detected as bromine, but accumulates as perbromide in the electrolyzate. Additionally, perbromide in the circulating electrolyzate is drawn to the cathode where a portion of it is reduced, with a consequent loss of actual current efficiency. Toward the completion of the electrolysis, the system efficiency changes as the bromide ion concentration is reduced due to the continued conversion to bromine. As the bromide ion concentration is reduced, the $Br_2/Br_3^-$ equilibrium is displaced to the left. The bromine does not complex and stabilize as perbromide but is efficiently removed from the system, corresponding to increased bromine recovery and efficiency of operation. As a result, cathodic reduction of perbromide ion becomes less significant and the current efficiency for bromine production increases accordingly. Apparent current efficiency increases as accumulated $Br_3^-$ decomposes to yield $Br_2$, and actual current efficiency is favorably affected by the decline in absolute $Br_3^-$ concentration. By continuously withdrawing bromine in accordance with this invention, the $Br_2/Br^-/Br_3^-$ equilibrium is displaced and there is a corresponding reduction in cathodic losses due to reduction of perbromide. Bromine is therefore generated with increasing Faradaic current efficiency.

In a further embodiment of the electrogeneration process of the invention, the feed solution is a mixed halide solution containing both chloride and bromide ions, preferably with a high ratio of $Cl^-$ ion to $Br^-$ ion. The mixed halide feed solution may be processed using divided or undivided cells. The chloride ions in the electrolytic solution help maintain high conductivity and high current efficiency.

In processing mixed halide solutions, electrolysis of chloride ions to chlorine is more dominant than electrolysis of bromide ions to bromine. In contrast. to $Br_2/Br^-/Br_3^-$ equilibrium, the equilibrium constant for the chlorine reaction:

$$Cl_2 + Cl^- = Cl_3^-$$

is relatively low. Under standard electrolysis conditions, chlorine quantitatively escapes the system as a gas. In the mixed halide system, however, the chlorine immediately oxidizes bromide ions to bromine:

$$Cl_2 + 2Br^- = Br_2 + 2Cl^-$$

With each pass through a recirculating system, additional bromide and chloride are electrolyzed. The resulting chlorine reverts back to chloride upon oxidation of bromide. Increased bromide conversion is therefore achieved as compared to bromide-only systems. Because the chlorine is converted back to chloride ions, the system can be operated on a continuous or batch recirculating basis without replenishing chloride. Bromide is progressively converted to bromine and must be continuously or periodically replenished.

The mixed halide feed solution has a bromide ion content between about 0.01M and about 0.1M, preferably between about 0.02M and about 0.07M, more preferably about 0.05M. The chloride ion content of the cell feed solution is between about 0.1M and about 1M, preferably between about 0.2M and about 0.7M, more preferably about 0.5M. The molar ratio of chloride ion to bromide ion is preferably at least about 5:1, more preferably at least about 10:1. For mixed halide electrolysis the feed solution provides NaCl electrolyte, acid and bromide ions, Suitable feed solutions include, for example, NaCl and HBr in a molar ratio of about 10:1; NaCl, NaBr and $H_2SO_4$ in a molar ratio of about 10:1:1; and NaCl, NaBr and HCl in a molar ratio of about 10:1:1, among others.

After electrolysis, the mixed halide electrolyzate is caused to flow out of the cell. When operated on a recirculating batch basis, the composition of the electrolyzate flowing out of the cell changes as the reaction progresses. When operated on a continuous basis whereby bromide ions and chloride ions in the feed solution are continuously or intermittently replenished, the composition of the electrolyzate flowing out of the cell will attain substantially steady state conditions. When the cell is operated continuously, the electrolyzate flowing out of the cell for one particular preferred embodiment contains about 0.05M HOBr or HOBr precursors ($Br_2$, $Br_3^-$), about 0.01M bromide ion, and between about 0.45 and about 0.5M chloride ion, and exhibits a pH of about 4 to 7. When the cell is operated on a batch basis, the electrolyzate flowing out of the cell contains between about 0.02M and about 0.07M HOBr or HOBr precursors, between about 0.01M and about 0.07M bromide ion, between about 0.2M and about 0.7M chloride ion, and exhibits a pH between about 1 and 7.

The product stream of mixed halide electrolysis may be transferred to a recirculation vessel and bromine recovered therefrom as described above.

In an alternative embodiment to removing bromine-laden vapor from the electrolytic product stream, the bromine product can be allowed to remain in the electrolyzate where it forms HOBr. The resulting electrolyzate product is suitable for introduction directly into an aqueous system for water treatment.

The production of HOBr can be accomplished using each of the feed bromide streams described herein, but use of a mixed halide stream is preferred. The mixed halide process facilitates higher conversion of hydrogen bromides which results in an electrolyzate which is substantially free of bromide, and also corresponds to greater conversion of the $Br^-$ feed material as HOBr. In this particularly preferred embodiment, the feed solution contains HBr and NaCl. The use of HBr in the feed stream provides $Br^{-1}$ for the electrolysis but also advantageously provides acid for buffering the system to control the pH below about 6.2. Ensuring overall acid conditions in this manner favors the production of HOBr over $NaBrO_3$. The other acidic mixed halide feed solutions, the $NaCl/NaBr/H_2SO_4$ and $NaCl/NaBr/HCl$ solutions, may also be electrolyzed for substantial conversion of $Br^-$ without exceeding a pH of about 6.2. If the system is operated such that a portion of the acid is continuously or intermittently removed from the system with the HOBr product, make up acid may be continuously or intermittently added to the recirculating stream as needed.

For each of the alkali metal bromide, hydrogen bromide and mixed halide processes described herein, the cathodic reduction of water during electrolysis:

$$2H_2O + 2e = H_2 + OH^-$$

gives rise to hydroxyl ions which causes the solution pH to rise. If the feed solution includes hydrobromic acid and has a pH between about 0 and 2, when a substantial quantity of the $Br^-$ ion, e.g., 0.8 moles per mole HBr in the feed solution, is converted to HOBr, the electrolyte attains a pH no higher than about 6.2. Hydrobromic acid in the electrolyte provides both a source of $Br^-$ ions for conversion to $Br_2$ or HOBr, and a source of $H^+$ ions to buffer the system and maintain overall acidic conditions. Under such conditions, oxidation of $Br^-$ ion to $BrO_3^-$ ion is prevented, without the need for addition of acid to buffer the system. In contrast, where the reaction involves an equivalent amount of sodium bromide rather than hydrobromic acid, the electrolytic solution pH would likewise increase, but it would continue to increase and approach 12. In the sodium bromide process, bromine disproportionates according to the following equation:

$$3Br_2 + 6NaOH = NaBrO_3 + 5NaBr + 3H_2O.$$

The anodic oxidation of NaBr in an undivided cell forms the basis for the manufacture of $NaBrO_3$. To prevent bromate formation, acid must be continuously or intermittently added to the recirculating solution to control pH below about 8.

As noted above, where the feed solution comprises an alkali metal bromide such as NaBr or KBr and does not otherwise comprise an acid, an acid such as HCl or HBr is continually fed to the system for pH control and to prevent formation of bromate. If pH control is effected by addition of HCl, accumulation of $Cl^-$ ion necessitates either batch operation or a $Cl^-$ purge which balances HCl addition. If pH control is effected by addition of HBr, bromide ions are continually supplied to the system, and converted to $Br_2$. Continuous operation may thereby be achieved as the $Br_2$ exiting the system in the product is replaced by $Br^-$ in the acid. Additionally, bromide ion make up may be supplied independently of pH control. Continuous operation, therefore, is an option whether the initial feed solution is an alkali metal bromide solution, hydrobromic acid solution or mixed halide solution.

Figure 5:
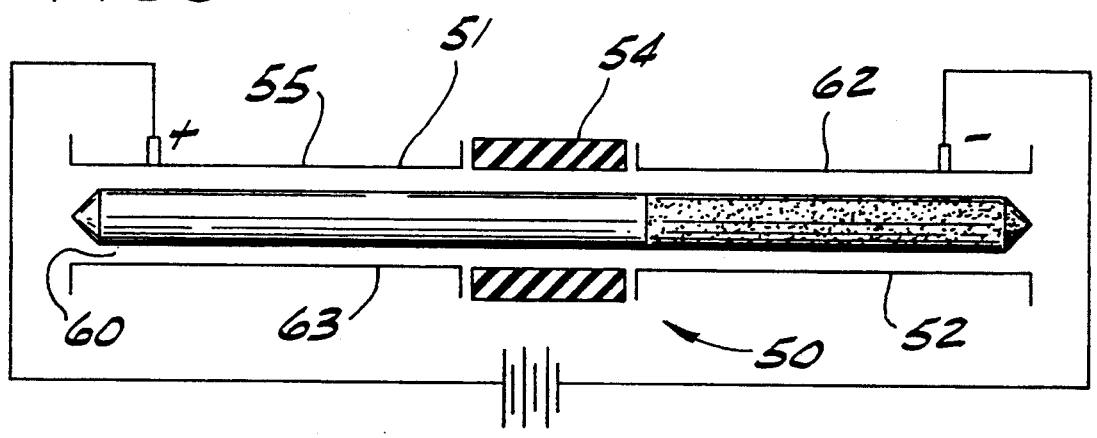
FIG. 5 is a schematic illustration of a cell which is preferred for the practice of the invention.

FIG. 5 is a schematic illustration of a type of undivided cell that can be utilized effectively in the processes of the invention. A cell of the type illustrated is available from Electrocatalytic, Inc., of Union, New Jersey under the trade designation "Chloropac". This cell, which was originally developed for generation of hypochlorite in shipboard seawater systems, is described in detail in literature available from Electrocatalytic, Inc. The apparatus depicted in FIG. 5 is a bipolar dual cell assembly which comprises an outer electrode subassembly 50 that includes two outer cylindrical electrodes 51 and 52 that are substantially axially aligned and mechanically attached to each other through an insulating spacer 54. The cell assembly further comprises an inner cylindrical electrode 55 that is of smaller diameter than either of electrodes 51 and 52, is concentric therewith, and is substantially coextensive longitudinally with subassembly 50. The annular space 60 between subassembly 50 and electrode 55 provides the path along which electrolytic solution may be caused to flow through the cell. As illustrated in the drawing, outer electrode 51 serves as an anode to which current is supplied to the bipolar dual cell assembly and outer electrode 52 serves as a cathode from which current is withdrawn. Accordingly, the portion 63 of inner electrode 55 facing anode 51 serves as a cathode and the portion 62 of the inner electrode facing cathode 52 serves as an anode.

In a particularly preferred embodiment of the invention, each of electrodes 51, 52 and 55 is constructed of titanium, and both anode 15 and anodic portion 62 of electrode 55 are coated with platinum. The platinized surface catalyzes the anodic reaction and promotes generation of bromine at high current efficiency and minimum overvoltage.

In operation of the cell of FIG. 5, an electrolytic feed solution containing bromide ions is caused to flow through annular path 60 between the electrodes and a direct current is applied to the flowing solution. Bromide ions are oxidized to bromine at anodes 51 and 62, while hydrogen is generated in the solution at cathodes 52 and 63. To provide the desired rate of mass transfer from the bulk solution to the anode surface, the velocity through the cell is preferably about 1.22 to 2.44 m/sec., more preferably between about 1.52 and about 2.13 m/sec.

In addition to the cell configuration illustrated in FIG. 5, a particularly preferred undivided cell construction is a modified version of the divided cell construction shown in FIGS. 2 and 3 and discussed in detail hereinbelow. The divided cell of FIG. 3 is modified in that inlet and outlet channels 106 and 107 on the mating electrode/frame structure are not included or are plugged such that there is a single inlet and a single outlet for both of the cell sides rather than one inlet and one outlet for each of the drawn together cell sides. A further modification is that there is no ion exchange membrane 141, and only one of gaskets 143 and 145 is needed. Elimination of the membrane and of one of the gaskets serves to decrease the interelectrode spacing, thus decrease the resistance between electrodes and increase current efficiency, and decrease the number of potential sources of leakage. In addition to the cell designs specifically described, a variety of different cell designs may provide the high rates of mass transfer, even potential and current distribution and high ratio of electrode area to working volume that characterize the Chloropac type unit.

As an alternative to using undivided cells, divided cells may be used in the process of the invention. Divided-cell electrogeneration in accordance with this invention is operated on a batch basis, on a recirculating batch basis, on a recirculating continuous basis, or on a once-through basis, depending on the particular application.

Illustrated in FIG. 1 is a preferred embodiment of the divided-cell process of the invention. In summary, alkali metal bromide brine or hydrobromic acid is subjected to electrolysis for generation of bromine on the anode side of an electrolytic cell 1, the bromine-containing brine is stripped for removal of bromine vapor in a vacuum stripping column (or tower) 3, and the stripped brine is recycled to the cell, or bank of cells. While the schematic illustrates a single cell, a bank of multiple cells, or "cell stack," is employed. A vapor containing water and bromine exits the top of the stripping column and is condensed in condenser 5, producing a two phase condensate comprising liquid bromine and bromine water. The bromine water is decanted from the liquid bromine in a separator 7, and the bromine water is recycled to the cell stack via the stripping tower. Hydrogen gas and hydroxide ion are generated on the cathode side of the cell stack.

Where the feed solution comprises an alkali metal bromide brine, it is adjusted to pH 10, and then passed in series through a pair of ion exchanger columns 9 and 11 for removal of metal ions such as $Pb^{+2}$, $Fe^{+3}$, $Cd^{+2}$, $Zn^{+2}$, $Ca^{+2}$, $Cu^{+2}$, and $Mg^{+2}$. Brine leaving the ion exchange column is adjusted to a pH of about 2 to about 6, preferably about 3 to about 4, advantageously by addition of hydrochloric acid or hydrobromic acid, most preferably the former, and is then delivered to a holding tank 13. Hydrochloric acid that is substantially devoid of divalent metal ions may be charged directly to tank 13, by-passing ion exchange columns 9 or 11. Brine or acid leaving holding tank 13 is heated to at least about 45° C., preferably 45°-55° C., and is then fed to the bottom portion of vacuum stripping vessel (column) 3, where it mixes with recycle brine from the stripper and bromine water from separator 7. Bromine is removed from this mixture by the operation of the stripper, which is heated by warm water circulated through a jacket (not shown) on the outside of, or a coil inside, the column. Bromine-lean mixed solution is discharged from the bottom of the column and transferred to the anode compartment 15 of cell 1 by a transfer pump 33. Cell 1 is a divided cell, the dividing membrane preferably comprising a cation exchange membrane 17 which inhibits transfer of bromide ions to the cathode chamber (compartment) 23 or hydroxyl ions to the anode chamber (compartment) 15 of the cell. Electrolysis causes generation of bromine at the anode, which remains substantially in the condensed phase. In part, the bromine reacts with residual bromide ion in the solution to form perbromide ions; in part liquid bromine dissolves in the aqueous liquid phase; and in part the liquid bromine may be hydrolyzed to produce hypobromous acid. As discussed below, a portion of any organic contaminants may also be oxidized in the anode compartment of the cell.

The electrolyzate, more particularly described in divided-cell electrolysis as the anolyte product, is removed from anode compartment 15 and fed through an anolyte transfer line 19 to the upper portion of vacuum stripping column 3. In the anolyte transfer line, the pH of the anolyte product is adjusted, as necessary, to pH 4, preferably by addition of hydrobromic acid or hydrochloric acid from an acid supply tank 35. Adjustment may be necessary if the pH has drifted to significantly above 4 due to migration of hydroxyl ions through the dividing membrane into the anode compartment of the cell.

A vacuum ranging from about 50 mm Hg (2″ $H_2O$) to 600 mm Hg, typically of about 100 to about 250 mm Hg, is applied to the top of stripping column 3 via condenser 5. To assist in the stripping operation, air or an inert gas, preferably nitrogen, is sparged into the lower portion of the column or tower. Preferably, the tower is simply a cylindrical vessel containing downwardly flowing aqueous solution from which water vapor and bromine is stripped. If desired, the tower may contain packing or other means to enhance gas liquid mass transfer. Vapor comprising bromine and water leaves the top of column 3 through a vapor line 21 and flows to indirect condenser 5, which is typically of shell and tube construction and is cooled by cooling tower water or the like.

In condenser 5, the vapor condenses in two phases: an aqueous phase containing 3-4% bromine dissolved in water; and a bromine liquid phase. The two phase condensate is drained to separator 7 where bromine water separates as the upper phase and liquid bromine as the lower phase. Upon separation of the two phases by decantation, the liquid bromine phase is removed as a product of the process of FIG. 1. Typically, this liquid bromine product is subjected to further processing for removal of residual moisture and, possibly for removal of organic contaminants. Moisture is readily removed by contacting the bromine liquid with sulfuric acid.

As noted above, the bromine water phase is returned to the bottom portion of column 3.

Although this particular embodiment describes condensation of the bromine vapor, condensation may be foregone and the bromine vapor used directly in a water system or chemical reaction system similarly to processes described above in connection with undivided-cell electrolysis.

Where the feed solution to the process comprises an alkali metal bromide, an alkali metal hydroxide solution is charged to cathode compartment 23 of cell 1. Water is electrolyzed at the cathode to produce hydrogen gas and additional hydroxyl ion. Where the feed solution comprises an alkali metal bromide, alkali metal ion is transferred through cation exchange cell membrane 17, balancing the hydroxyl ions produced at the cathode, and a catholyte product enriched in alkali metal hydroxide is removed from the cathode compartment. The catholyte product is transferred via a catholyte transfer line 25 to a catholyte recirculation tank 27 where hydrogen gas produced at the cathode is separated from the liquid phase. Net production of alkali metal hydroxide solution is removed from the process in a product line 29 connected to transfer line 25. Makeup deionized water is added to tank 27, and the diluted alkali metal hydroxide solution is recirculated to cathode compartment 23 via a transfer pump 31.

Where the feed solution to the process is a hydrobromic acid solution, the solution charged to the cathode compartment may be a mineral acid. Where hydrobromic acid is electrolyzed, hydrogen ions rather than alkali metal ions travel toward the cathode, and react with the hydroxyl ions to regenerate water. In a divided cation exchange membrane cell, hydrogen ions rather than alkali metal ions traverse the cation exchange membrane. In any event, no net makeup is ordinarily required where the feed solution is hydrobromic acid.

The various steps of the process can be carried out on either a continuous or batch basis. Preferably, however, the bromide ion feed solution is charged batchwise to the bottom of column 3, and then continuous circulation is established between anode compartment 15 and column 3 via pump 33. Thus, a system comprising both the stripping column and the anode side of the cell operates in a continuous flow mode while a batch of feed solution is being processed. Although conveniently charged to the bottom of column 3, the feed solution may initially be charged at any point in that circulating system. A steady state level of equivalent molecular bromine is quickly established in the anolyte product stream entering the column, and the column operates on an essentially continuous steady state basis once a return flow of bromine water from separator 7 reaches an equilibrium rate. In commercial operations, the stripper may readily reach a steady state continuous mode if a heel of bromine water remains in the separator from processing of previous batch of feed solution. On the anode side of the cell, equivalent molecular bromine concentration may readily reach an equilibrium level, but operation is on a continuous but non-steady state basis so far as bromide ion concentration is concerned. Ordinarily, this will result in an increase in cell voltage at high bromide ion conversion. After the circulating bromide ion solution reaches a target level of depletion, it is discarded from the system and a new batch of feed solution is transferred from holding tank 13 to the bottom of column 3.

Operation on the cathode side may be on a batch or continuous basis, and it is not necessary to operate one side of the cell in the same mode as the other. Preferably, however, the cathode side is operated in a continuous, steady state mode. The concentration of the catholyte stream increases incrementally during passage through cathode compartment 23, and a fraction of this stream (containing the net production of alkali metal hydroxide where the feed solution is a NaBr brine) is removed in product line 29. An amount of water equivalent to that removed in line 29 is added to tank 27.

The process of the invention is effective for recovery of bromine from hydrobromic acid and a wide variety of bromide ion solutions of low pH. The process is especially advantageous for the recovery of bromine from organic contaminated bromide ion waste streams, such as those generated in the nucleophilic substitution of organic bromide compounds. Alkali metal bromide compositions of the latter type typically contain between about 5% and about 35% by weight bromide ion and between about 0.2% and about 10% by weight organic materials, and have a pH of between about 1 and about 14. Hydrobromic acid solutions derived from such sources contain between about 5% and about 47.5% by weight bromide. Also useful as feed materials in the process of the invention are alkali metal bromide solutions obtained from absorption in sodium hydroxide absorption of the HBr off gas from organic brominations. Such compositions are typically alkaline, and may contain between about 7% and about 46% by weight NaBr and between about 1% and about 5% by weight NaOH. As noted above, such compositions are acidified to pH 2 and about 6, preferably about 3 to 4 before introduction into the anode compartment of the electrolytic cell. Broadly, the composition of the feed to the electrolytic cell may contain between about 5% and about 35%, preferably between about 8% and about 25%, by weight bromide ion and up to about 10% by weight organic material, and have a pH of between about 2 and about 6. Lower pH will generally prevail where the electrolyte is HBr as compared to alkali metal bromide.

In the ion exchange treatment, the bromide solution is treated to reduce the level of alkaline earth and transition metals to a level preferably not greater than about 20 ppb. Adjustment to an alkaline pH is necessary for effective functioning of the ion exchange columns. The solution may also be treated, if desired with $BaCl_2$ for removal of sulfates. After ion exchange, the pH is typically about 4, which is optimal or nearly optimal for cell operation. If the pH of an alkali metal solution is below about 2 or above 6, it is adjusted by addition of acid or base. If the pH is too low ($<1$), the stability of corrosion resistant coatings on dimensionally stable anodes may be lowered. However, if graphite anodes are used, operation at well below pH 1 is entirely feasible.

Figure 2:
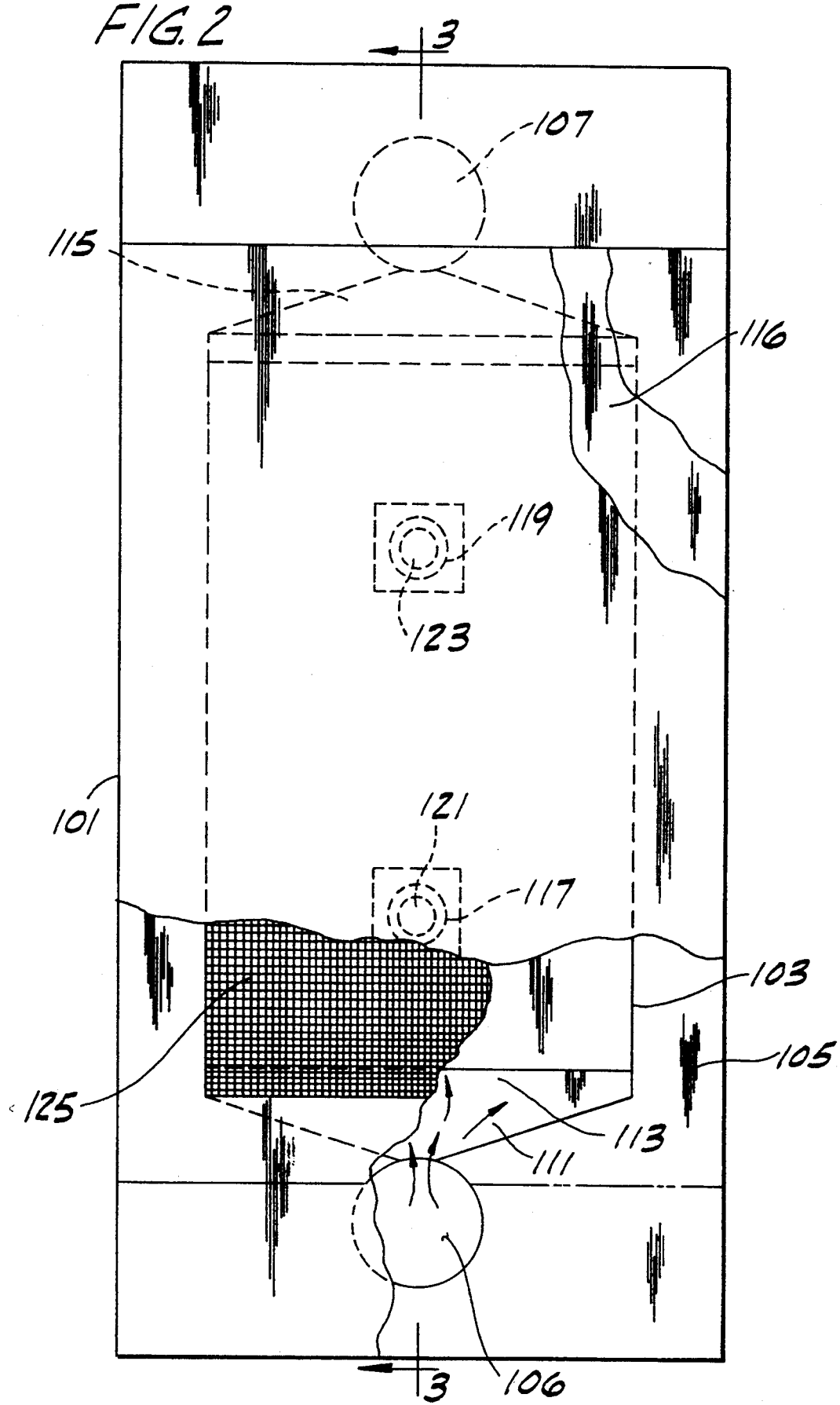
FIG. 2 is an illustration of a cell that is preferred for the practice of the invention, partially broken away to show the cell inlet and screen electrode.
Figure 3:
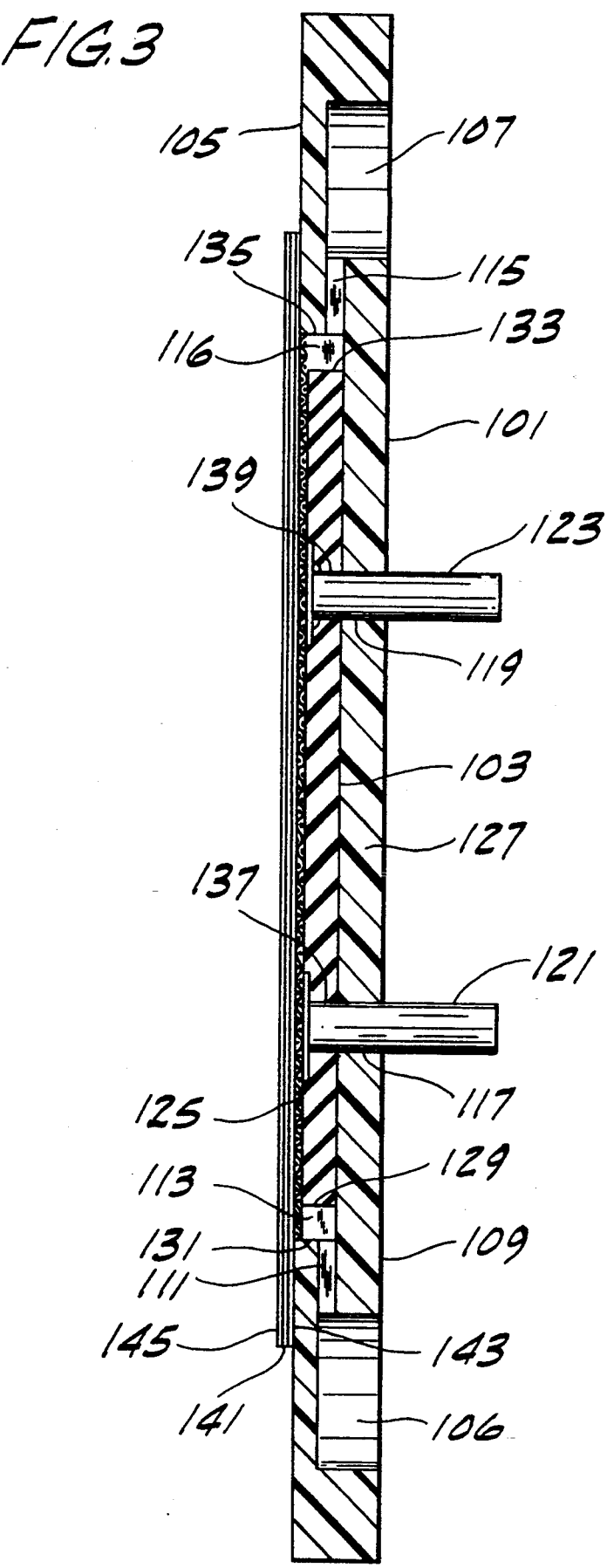
FIG. 3 is a section taken along line 3—3 of FIG. 2.

Illustrated in FIG. 2 is preferred cell construction for use in the process of the invention.

A frame 101, in the form of a plate of plastic or other nonconductive material, includes a rectangular recess 103 in a first face 105 thereof for receipt of a sheet electrode. Integrally formed in the frame, on opposite ends of the recess are an inlet channel 106 and an outlet channel 107, each of generally cylindrical form. Channels 106 and 107 open to face 109 (See FIG. 3) of the frame (opposite face 105) but extend only about one half to ⅝ of the way through the plate and thus do not directly communicate with face 105. However, channel 105 does communicate with a thin fan shaped channel 111, which extends parallel to but remote from both faces of the plate and provides a means for fluid flow connection between the channel and an inlet portion 113 of recess 103. Channel 111 thus serves as a flow distributor to distribute fluid from the inlet channel across the full width of the electrode, which distributor is advantageously integrally formed in the frame. A similar fan shaped channel 115 provides a means for fluid flow communication between outlet channel 107 and an outlet portion 116 of recess 103. Portions 113 and 116, remote from each other at opposite ends of the recess, thus define a path for flow of electrolytic solution through the cell. Two apertures, 117 and 119, in the recess area of the plate accommodate conductors 121 and 123 through which current may flow to or from the cell.

Referring to FIGS. 2 and 3, received in recess 103, there is a sheet electrode 125, constructed for example of metal mesh or grooved graphite., which thus defines means for flow of electrolytic solution between inlet portion 113 and outlet portion 116 along and parallel to the electrode sheet. Between electrode 125 and the recess is a deformable nonconductive liner 127, typically of rubber or plastic material. The liner generally extends across the width of the recess, but is shorter than the recess in the longitudinal direction. Thus, edge 129 of the liner is spaced from edge 131 of the recess in the region of recess inlet 113 to permit flow of electrolytic solution to the electrode from the recess inlet, and edge 133 of the liner is spaced from edge 135 of the recess in the region of recess outlet 116 to permit flow from the electrode to the recess outlet. Apertures 137 and 139 in the liner accommodate conductors 121 and 123.

In a divided cell, a membrane, preferably a cation exchange membrane 141 is located over and in contact with electrode sheet 125. Advantageously, the other side of the cell is constructed of a second frame, electrode sheet, and liner that are similar or essentially identical in character to those of the first side of the cell. The two sides of the cell are drawn together in conventional fashion, as in a plate and frame filter press type construction. Gaskets 143 and 145 are provided for sealing the cell. On the anode side of the cell, the gasket is preferably of VITON elastomer. VITON is a fluoroelastomer based on the copolymer of vinylidene fluoride and hexafluoropropylene. On the cathode side it is preferably of EPDM rubber (terpolymer elastomer made from ethylene propylene diene monomers), but other materials known to the art can be used.

The anode is preferably a dimensionally stable sheet of titanium metal mesh, provided with a coating of a material which inhibits corrosion of titanium by the electrolysis conditions or the solution in the anode chamber. Preferred coating materials include platinum and ruthenium oxide, for example, the type $CX-RuO_2$ anode available from El Tech Systems. Particularly advantageous in certain solutions is a proprietary coating used on cells available from Electrocatalytic Corp., which is adapted for $F^-$ ion electrolysis, and is in any case resistance to fluorides in the solution. Another useful anode material is an alloy of about 90% by weight titanium and about 10% tantalum, which is resistant to corrosion under anodic conditions even in the absence of a corrosion resistant coating.

Although dimensionally stable anodes are preferred in many applications, it has been found that graphite anodes also serve effectively in the electrolytic cell of the invention.

The cathode may be constructed of any material conventional in the art. Nickel, stainless steel, Hastelloy alloys and graphite are all useful materials of construction for the cathode.

As the cell membrane in a divided cell, the cation exchange membrane sold by DuPont under the trade designation "NAFION-324," and the membrane sold by Asahi Glass under the trade designation "FLEMION". These are asymmetric materials having a perfluorsulfonic acid polymer layer contacting the anolyte and a perfluorocarboxylic acid polymer layer contacting the catholyte. A fine inert polymer gauze may be incorporated for reinforcement during cell construction and service. These particular membranes have been shown to provide high $Na^+$ ion selectivity and high chemical stability, and to allow the production of 32-50% by weight NaOH solution in the cathode compartment without significant transport of $OH^-$ ion to the anolyte, which would reduce current efficiency.

As noted hereinabove, the divided cell construction of FIGS. 2 and 3 may be modified to provide a particularly advantageous undivided cell construction, as desired.

In the operation of the electrolytic cell of the invention, the bromide solution flows through the cell in contact with the anode. The cathode is in electrical communication with the solution either directly, as in an undivided cell or, in the preferred divided cell described above, the cathode is in electrical communication with the solution via the catholyte solution and the cation exchange membrane. Alkali metal or hydrogen ions carry the current by passage through the membrane. Bromine is thus generated at the anode to produce an electrolytic solution containing bromine.

Preferably, electrolysis of the bromide ion solution is conducted on a batch basis, to a conversion of at least about 50%, preferably between about 80% and about 95%. The cell is preferably operated at an anode current density of between about 1 and about 4 kA $m^{-2}$, more preferably between about 1.5 and about 2.5 kA $m^{-2}$, and a temperature of between about 20° and about 80° C. more preferably between about 35 and about 65° C. Operation under these conditions at the preferred electrode spacing discussed above generally requires a cell voltage of between about 3.3 and about 3.8, depending on the initial concentration of bromide ion, the concentration of other electrolytes in the bromide ion feed solution, the concentration of electrolytes and conditions of operation on the cathode side, the degree of bromide ion conversion, and the current density. High anode current efficiencies are achieved in the process of the invention, typically in the range of about 70% to about 100%. The time to achieve a given conversion can be computed directly from the anode surface area, current density, current efficiency and the volume and initial concentration of the feed solution in the anode compartment.

During the electrolysis, the anolyte product solution is withdrawn from the anode chamber of the cell and transferred to the vacuum stripper for recovery of liquid bromine. As withdrawn from the cell, the anolyte product may contain between about 0.5% and about 10%, preferably between about 4% and about 6%, by weight equivalent molecular bromine and between about 45% and about 1%, preferably between about 5% and about 2%, by weight bromide ion, and exhibit a pH of between about 2 and about 6, preferably between about 3 and about 4. Equivalent molecular bromine is defined in molar terms as the sum of the actual molar concentration of molecular bromine, the molar concentration of perbromide ion, the molar concentration of hypobromous acid, and the molar concentration of hypobromite ion.

The initial charge of caustic solution to the cathode chamber preferably contains between about 5% and about 50%, more preferably between about 30% and about 35%, by weight alkali metal hydroxide. Where the cathode side is operated continuously and the anode feed solution comprises a NaBr brine, the strength of the catholyte is typically enriched by about 2-10%, preferably by about 4-7% by weight, depending on the relationship between anode surface area/cathode surface area, anode/cathode side working volume, anode vs. cathode current efficiency, and the degree of conversion on the anode side. Cathode current efficiencies achievable in the cell of FIG. 2 range from about 70 to about 95%.

Hydrogen generated at the cathode may be vented to the atmosphere or recovered for use as a boiler fuel supplement, in hydrogenation reactions, or as a product of commerce. Before use, the hydrogen may be cooled, dried and purified in accordance with methods well known in the art.

The anolyte product withdrawn from the anode chamber is charged to the upper portion of the stripping column, and recovered under negative pressure. In the stripping column, the liquid mixture is heated to at least about 45° C., but not greater than about 95° C. In order to minimize vaporization of water and organic contaminants, the liquid mixture is preferably heated to not greater than about 60° C., most preferably to about 45° C. to about 55° C. A vacuum of between about 2 and 24 in. Hg vacuum is applied to the top of the column. To aid in the stripping process, nitrogen or other inert gas may be sparged into the solution in the stripper pot. In continuous stripping, the equivalent molecular bromine concentration at the discharge of the column is between about 0.12% and about 1.0%, preferably between about 0.2% and about 0.8%, by weight. Bromine vapor and a modest amount of water vapor are removed from the liquid phase during stripping. The vapor stream is condensed in condenser 5 at a temperature of about 5° to 20° C. under essentially the same pressure as the head of the stripper. The two phase condensate drains to separator 7 where decantation is carried out.

The degree of recovery of bromine liquid per stripper batch, as a percentage of equivalent molecular bromine in the anolyte product solution, is significantly influenced by the temperature at which stripping is conducted. The higher the pot temperature, the greater the fraction of water vapor in the vapor stream. Since essentially all this water vapor must be condensed in the course of condensing the bromine vapor, and because the water phase is essentially saturated with bromine, a high water content of the stripper vapor results in partitioning a significant portion of the elemental bromine to the water phase and consequent recycle to the stripper pot. By operating the stripping column under vacuum at a low temperature, the process of the invention provides a vapor stream with a minimal water content, resulting a high yield of bromine liquid. Such conditions may also tend to inhibit the formation with a sludge or residue from the organic contaminants.

In addition to the benefit in $Br_2$ recovery, operation of the stripper under vacuum provides safety, energy savings, and environmental benefits. Maintenance of negative pressure in the vapor streams insures against leaks of bromine gas to the surroundings. Liquid drained from the condenser is pumped to storage under positive pressure. However, control of leaks in the liquid phase system is generally more manageable than control of leaks through an entire positive pressure system.

Where the feed solution to the cell is contaminated with organic material, a portion of the organic material may be eliminated in the anode chamber operation. Although we do not wish to be held to a particular theory, it is believed that certain carboxylic acid contaminants are subject to the Kolbe oxidation under anodic conditions. The Kolbe oxidation partially converts the contaminants to carbon dioxide, leaving a residual organic substrate of higher volatility. Direct anodic oxidation of other organic materials may produce $CO_2$ which is vented from the cell. Generally, it has been found that, in a single batch electrolysis, the organic content of a organic nucleophilic substitution waste stream may be reduced by as much as 20% to 75%. Recycle of the stripper bottoms solution may be expected to increase that proportion somewhat. However, it is likely that the organics in most waste streams include non-volatile components which need to be removed in a purge stream from the process. Nonetheless, even with a modest purge stream, the process of the invention, as illustrated in FIG. 1, is effective for recovery of over 80% of the bromide ion content of the waste stream in the form of liquid bromine.

Of course, the requisite purge rate may be higher for some organic contaminants than for others. However, relatively high level of contamination can be tolerated for organic compounds which are difficult to oxidize, do not react with bromine, and do not consume current destined for $Br^-$ oxidation. Compounds meeting these criteria include acetonitrile, dimethylformamide, aliphatic hydrocarbons, aromatics which are not activated to ring substitution by $Br_2$ (such as benzene, chlorobenzene, benzaldehyde and benzoic acid), perfluorocarbons, anionic surfactants, non-ionic surfactants, and quaternary ammonium compounds.

The following examples further illustrate the invention:

EXAMPLE 1

An aqueous solution of pH 1 containing 15% by weight NaBr and 2250 ppm Total Organic Carbon (TOC) (in the form of methanol, dimethyl sulphoxide, dimethyl disulphide, trimethyl acetic acid and MIBK) was adjusted to pH 10 with base and passed through a Duolite C-467 ion exchange resin at a rate of 10 Bed-Volumes per Hour to remove deleterious cations. The emergent solution contained 10 ppb $Ca^{2+}$ ion whereas $Fe^{3+}$, $Zn^{+2}$, $Mg^{+2}$, $Cu^{+2}$ and $Pb^{+2}$ ions were not detected. Concentrated HCl was added to pH 4. The solution was admitted to a jacketed vacuum-stripping tower which also served as an electrolyte recirculation reservoir. A centrifugal pump delivered the solution to the anode compartment of a plate and frame-type membrane cell equipped with a $RuO_2$-coated Ti mesh anode and a Ni mesh cathode. A Nafion-417 membrane separated the respective compartments. A 5% NaOH solution was similarly recirculated through the cathode side of the cell. Electrolysis was conducted batch-wise with respect to the charge of contaminated NaBr solution, but in the course of processing, this batch was continuously passed through the anode compartment and continuously circulated between the anode compartment and the reservoir. The 5% sodium hydroxide solution was continuously circulated through the cathode compartment at a current density of 1.5 kA $m^{-2}$, and temperature 50° C. The mean cell voltage was 3.82 V. Nitrogen gas was sparged through the base of the stripping tower/recirculation reservoir and a vacuum was applied at the top (10 in. Hg). Vapor leaving the tower was drawn through a dry-ice/isopropanol cold-trap or through 20% NaOH absorption towers. The electrolytically generated $Br_2$ (and a little water) was continuously removed from the system in this fashion and was condensed on the cold surfaces of the dry-ice trap or absorbed in the 20% NaOH solution. Periodically, the pH of the anolyte was adjusted to 4 by addition of concentrated HCl solution between the cell discharge and the recirculation inlet to the reservoir. On termination of electrolysis, the current efficiency of the $Br_2$ generation process was determined by the weight of elemental $Br_2$ recovered or by iodometric titration of the caustic scrubber. Acid-base titration was used to establish the current efficiency of the cathodic process. It was found that at 80% conversion of $Br^-$ ion, $Br_2$ was produced with 91% current efficiency whereas NaOH was produced with 67% current efficiency. The $Br_2$ stripping efficiency (defined as the ratio of $Br_2$ stripped from solution and the total amount of $Br_2$ produced) was 98.4%. The TOC level was measured in the depleted NaBr solution after termination, and found to be about 1640 ppm.

When the reaction was repeated under the same conditions for a pure uncontaminated 15% by weight NaBr solution (pH 4), the average cell voltage was 3.3 V. At 84% conversion, the current efficiency for $Br_2$ generation was 100%. This indicated that some current is consumed in anodic oxidation of organic material in the contaminated solution. This was confirmed by the 23% reduction in TOC for the solution after electrolytic processing.

EXAMPLE 2

An aqueous solution (pH 2) containing 15% by weight NaBr and 3650 ppm TOC (present as polyethylene glycol-600), was admitted to the anode compartment of a laboratory cell containing a $RuO_2$-coated Ti mesh anode and a Ni mesh cathode. The cell was separated by a Nafion-417 cation exchange membrane. A 2% by weight NaOH solution was the catholyte. Electrolysis was conducted at 1 kA $m^{-2}$ (average cell voltage 4.4 V) at ambient temperature. A precipitate was observed to form throughout the reaction. The anodically generated $Br_2$ was purged to strippers containing 46% NaBr using a fast stream of $N_2$. On termination of the electrolysis, 68% of the $Br^-$ ion had been converted to $Br_2$ with a current utilization of 76%. The precipitate was filtered from the anolyte which was found to contain 1430 ppm TOC (61% reduction).

EXAMPLE 3

A solution containing HBr (2% by weight) and $Na_2SO_4$ (0.5M) was introduced to an undivided plate and frame cell equipped with an AFX-5Q graphite anode and Ni plate cathode. The large inter-electrode gap accommodates glass beads as turbulence promoters. A current density of 1 KA $m^{-2}$ was employed for $Br_2$ generation (average cell voltage 14.9 V). Bromine was not recovered from solution. In the early stages of electrolysis, the current efficiency was quantitative, but fell to 78.5% at 10% conversion of $Br^-$ ion.

EXAMPLE 4

A commercially-available hypochlorination cell equipped with Pt electrodes was used to electrolyze a solution containing HBr (2% by weight) and $Na_2SO_4$ (0.5M) at a current density of 1.6 kA $m^{-2}$ (average individual cell voltage 1.86 V). The reaction was carried out in a sealed system of the type illustration in FIG. 1 in which $N_2$ gas was sparged into the bottom of the recirculation vessel and sucked out with a vacuum so that the net negative pressure was around 24 in. Hg. The $Br_2$ vapours were purged through a 46% NaBr stripper. At 4% conversion of $Br^-$ ion to $Br_2$, the current efficiency was 54%.

EXAMPLE 5

Sodium bromide solution (1.672M, approximately 17%) was recirculated (0.65 gpm) through an undivided cell equipped with a Ti anode coated with $RuO_2$ and a Ni cathode. The bromide solution was heated to 50° C. by means of a water jacket associated with the storage/recirculation reservoir. By use of a pH probe located prior to the cell inlet and a peristaltic pump delivering 6M HCl into the cell outlet stream, the pH was adjusted to 2.4. FIG. 4 represents a schematic of the set-up.

A current density of 1.5 $kAm^{-2}$ was passed between the anode and cathode ($E_{cell}$=3.0 V) and air was sparged to the bottom of the recirculation vessel. The bromine produced within the electrolyte was not allowed to accumulate in solution (as $Br_3^-$ ion). A negative pressure ($-2$ to $-5$ in Hg) was applied at the top of the recirculation vessel. Vapors (air, $H_2$, $H_2O$, and $Br_2$) were stripped through a 20% NaOH solution to permit the determination of $Br_2$.

Hydrochloric acid (6 Molar) was continuously added to neutralize the $OH^-$ produced as a result of cathodic reduction of water. A pH probe controlled the hydrochloric acid delivery to maintain the pH between 2.3 and 5.7.

Figure 6:
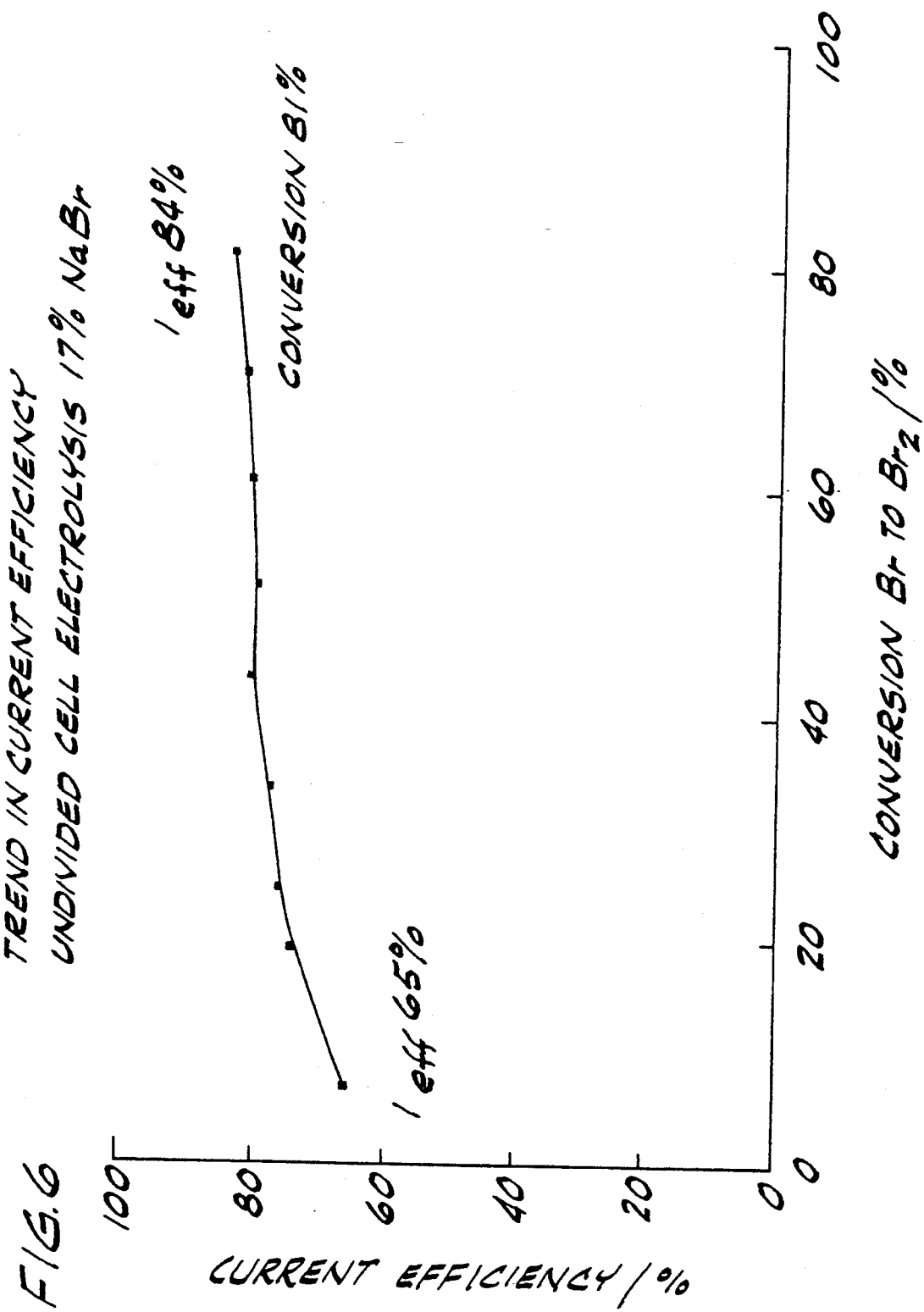
FIG. 6 is a plot illustrating the current efficiency trend for a particular embodiment of the invention.

FIG. 6 plots the trend in current efficiency against the conversion of $Br^-$ ion to $Br_2$ (measured by iodometric analysis of the caustic stripper). FIG. 6 illustrates that when the reaction was terminated, 81% of the bromide ion originally present in the electrolyte had been converted to $Br_2$ which had been vacuum-stripped from the liquid electrolyte. FIG. 6 also shows that in the early stages of electrolysis, the current efficiency was depressed (65%), but rose as the reaction proceeded. As noted, this increase in current efficiency corresponds to deliberate displacement of the $Br_2/Br^-/Br_3^-$ equilibrium.

EXAMPLE 6

A by-product NaBr stream (15.4%) contaminated with polyethylene glycol (TOC 2560 ppm) was recirculated (2 gpm) through an undivided cell equipped with a Ti anode coated with $RuO_2$, and Ni cathode. The NaBr solution was heated to 50° C. by means of a water jacket associated with the storage/recirculation reservoir. By use of a pH probe located prior to the cell inlet, and a peristaltic pump delivering 6M HCl to the cell outlet stream, the pH was adjusted to 2.6.

A current density of 1.5 $KAm^{-2}$ was passed between the anode and cathode ($E_{cell}$=2.75 V) and air was sparged to the bottom of the recirculation vessel. A negative pressure ($-5$ in Hg) was applied at the top of the recirculation such that the bromine produced within the electrolyte was not allowed to accumulate in solution (as $Br_3^-$ ion). The vapours (air, $H_2$, $H_2O$, and $Br_2$) were stripped through a 20% NaOH solution to permit the determination of $Br_2$.

During electrolysis, the $OH^-$ produced as a results of cathodic reduction of water was neutralized by continuous addition of 6M HCl. The pH probe controlled the delivery to maintain the pH between 2.5 and 3.2.

On termination of the electrolysis, analysis revealed a $Br^-$ ion conversion of 96.3% and a current efficiency of 81%. The TOC content of the process stream was reduced to 1250 ppm.

EXAMPLE 7

An electrolyte solution of pH 1.4 comprising NaCl (0.5M) and HBr (0.05M) was recirculated (1.5 gpm) through an undivided cell equipped with a $RuO_2$-coated Ti anode and a Ni cathode.

Figure 7:
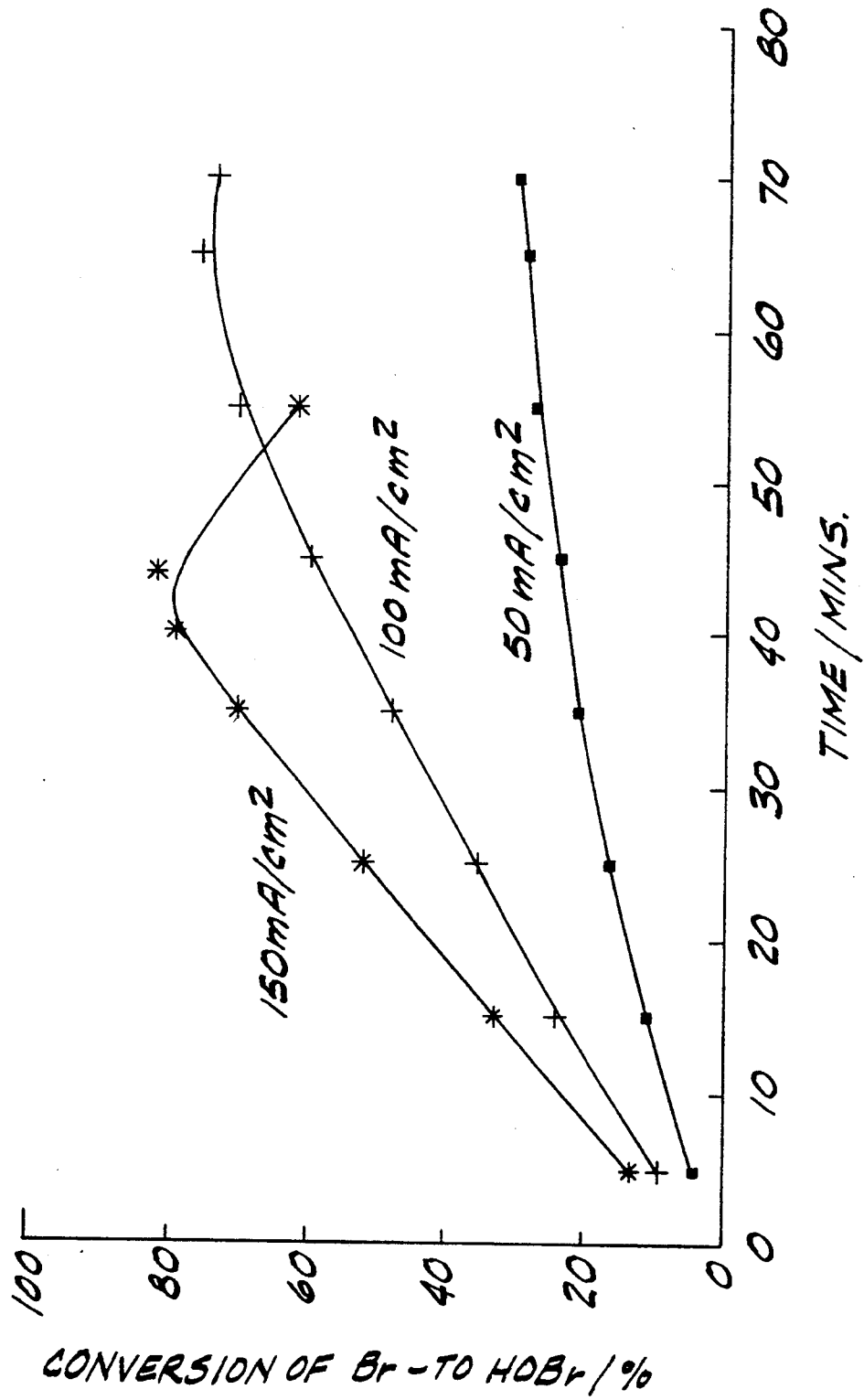
FIG. 7 is a plot illustrating the conversion of Br$^-$ to HOBr for a particular embodiment of the invention.

Electrolyses were performed at current densities 0.5, 1.0 and 1.5 kAm$^{-2}$ ($E_{cell}$=2.8 to 4.1 V). Periodically, the electrolyte was sampled and analyzed by iodometric titration. The results were used to compute the amount of HOBr produced (either as free HOBr, or equivalent HOBr from precursors $Br_3^-$ and $Br_2$). FIG. 7 plots the conversion of $Br^-$ ion to HOBr (free or equivalent) as a function of electrolysis time at 0.5, 1.0 and 1.5 kAm$^{-2}$. This Figure illustrates that HOBr is produced fastest at the highest current density (1.5 kAm$^{-2}$), which also corresponds with the maximum $Br^-$ ion conversion. After 45 minutes, 83% of the $Br^-$ ion was converted. Thereafter, the amount of $Br^-$ ion converted to HOBr fell off.

Figure 8:
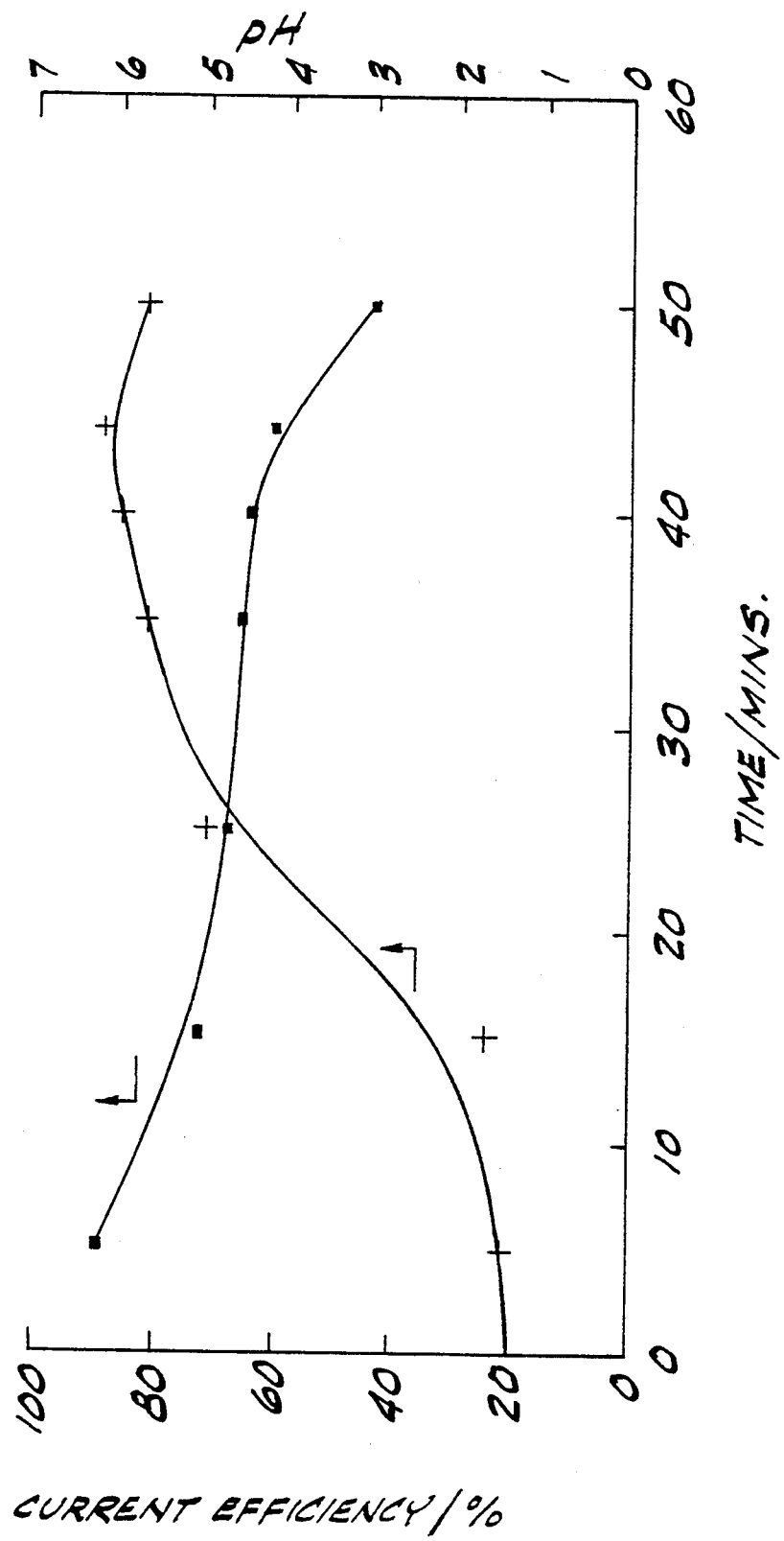
FIG. 8 is a plot illustrating trends in current efficiency and pH for a particular embodiment of the invention.

FIG. 8 plots the trend in current efficiency and electrolyte pH for the electrolysis conducted at 1.5 kAm$^{-2}$ of FIG. 7. Early in the electrolysis, the current efficiency was around 90%, but there was a marked decrease corresponding to increasing significance of the cathodic destruction of the oxidizing bromine.

FIG. 8 illustrates that prior to initiation of electrolysis, the electrolyte had a pH of 1.4. As the electrolysis proceeded, the cathodic reduction of water ($2H_2O + 2e = H_2 + OH^-$) gave rise to hydroxyl ions which caused the solution pH to rise as shown in the Figure. After 45 minutes, (when 83% of the $Br^-$ ion was converted to HOBr) the electrolyte pH reached 6.2.

In view of the above, it will be seen that the several objects of the invention are achieved and other advantageous results attained.

As various changes could be made in the above methods and constructions without departing from the scope of the invention, it is intended that all matter contained in the above description or shown in the accompanying drawings shall be interpreted as illustrative and not in a limiting sense.

What is claimed is:

1. A process for recovering bromine from an acidic solution containing bromide ion comprising:
    passing an electric current through said solution between an anode in contact with said solution and a cathode in electrical communication with said solution, thereby generating bromine by electrolysis of said solution at said anode to produce an electrolyzate containing bromine; and
    separating bromine as a vapor from said electrolyzate under negative pressure.

2. A process for recovering bromine from an acidic solution containing bromide ion comprising:
    passing an electric current through said solution between an anode in contact with said solution and a cathode in electrical communication with said solution, thereby generating bromine by electrolysis of said solution at said anode to produce an electrolyzate containing bromine; and
    separating bromine as a vapor from said electrolyzate under negative pressure at a temperature of not greater than 95° C.

3. A process as set forth in claim 2 wherein the temperature of said solution during electrolysis is between about 20° C. and about 80° C., and the current density is between about 1 and about 4 kA m$^{-2}$.

4. A process as set forth in claim 2 wherein the temperature of said solution during electrolysis is between about 35° C. and about 65° C., and the current density is between about 1.5 and about 2.5 kA m$^{-2}$.

5. A process as set forth in claim 2 wherein said acidic solution comprises an alkali metal bromide solution and initially contains between about 5% and about 35% by weight bromide ion and has a pH of between about 2 and about 6.

6. A process as set forth in claim 2 wherein electrolysis and recovery of bromine are carried out to the extent of converting at least about 50% of the bromide ion in said feed solution to recovered molecular bromine.

7. A process as set forth in claim 2 wherein said acidic solution comprises hydrobromic acid and initially contains between about 5% and about 47.5% by weight bromide in the form of bromide ion or dissolved HBr.

8. The process of claim 2 wherein the feed solution comprises between about 0.01M and 0.1M bromide ion and at least about 0.1M chloride ion.

9. The process of claim 2 wherein said bromide ion solution initially contains between about 8% and about 25% by weight bromide ion, between about 0.2% and about 10% by weight organic material, and has a pH of between about 2 and about 6, and wherein said electrolyzate contains between about 0.5% and about 10% by weight equivalent molecular bromine.

10. A process as set forth in claim 2 wherein a bromide ion feed solution is processed for recovery of bromine by:
    charging said feed solution to a system comprising a stripping vessel and an electrolytic cell containing said anode;
    continuously circulating the bromide solution between said electrolytic cell and said stripping vessel, the circulating solution passing continuously through said electrolytic cell and being circulated back to said stripping vessel as said electrolyzate; and
    continuously or intermittently removing bromine from said circulating solution under negative pressure in said stripping vessel.

11. The process of claim 10 wherein a source of bromide ions is continuously or intermittently supplied to the circulating solution to replenish bromide ions removed from the solution as bromine.

12. A process as set forth in claim 10 wherein said system comprises a stripping vessel and an undivided electrolytic cell.

13. The process of claim 12 wherein bromide ions are continuously or intermittently supplied to the circulating solution.

14. The process of claim 2 wherein the vaporous bromine removed from the electrolyzate is introduced into an aqueous system for water treatment.

15. The process of claim 14 wherein the vaporous bromine is introduced into an industrial water system for biocidal treatment thereof.

16. The process of claim 2 wherein the vaporous bromine removed from the electrolyzate is introduced into a chemical reaction system requiring bromine.

17. The process of claim 15 wherein the vaporous bromine removed from the electrolyzate is introduced into an organic bromination vessel.

18. A process as set forth in claim 2 wherein bromine is separated from said electrolyzate under negative pressure at a temperature of not greater than about 60° C.

19. A process as set forth in claim 18 wherein bromine is stripped from said electrolyzate under a vacuum of between about 2 and about 24 in. Hg vacuum.

20. A process as set forth in claim 19 wherein said vacuum is between about 4 and about 10 in. Hg vacuum.

21. A process as set forth in claim 20 wherein said temperature is between about 45° and about 55° C.

22. A process as set forth in claim 21 wherein gas is sparged into said solution to aid in the recovery of bromine.

23. A process for the recovery of bromine from a solution containing bromide ion and contaminated with organic material, said process comprising the steps of:
   passing an electric current through said solution between an anode in contact with said solution and a cathode in electrical communication with said solution, thereby generating bromine by electrolysis of said solution at said anode to produce an electrolyzate containing bromine; and
   separating bromine as a vapor from said electrolyzate under negative pressure.

24. The process as set forth in claim 23 wherein said bromide ion solution is a by product solution of an organic bromination and initially contains between about 5% and about 40% by weight bromide ion and between about 0.2% and about 10% by weight organic material.

25. A process for preparing a solution containing at least about 0.05M HOBr from a feed solution containing bromide ion and a source of acid comprising:
   passing an electric current through the feed solution between an anode and a cathode of an electrolytic cell which are in electrical communication with the solution, the solution remaining at a pH of less than about 6.2 during passage of said current therethrough has been inserted after "solution," thereby generating bromine by electrolysis of the solution at the anode and producing an electrolyzate containing bromine, the bromine reacting with water in the electrolyzate to produce a solution containing at least about 0.05M HOBr.

26. The process as set forth in claim 25 wherein bromide ion feed solution is processed by:
   charging said bromide solution to a system comprising an undivided electrolytic cell;
   continuously circulating the bromide solution through the electrolytic cell; and
   separating a first portion of the electrolyzate from the circulating stream and returning a second portion of the electrolyzate to the electrolytic cell.

27. The process of claim 26 wherein the feed solution contains between about 0.02M and 0.07M bromide ion in the form of HBr or an alkali metal bromide and between about 0.2 and 0.7M chloride ion in the form of HCl or an alkali metal chloride.

28. The process as set forth in claim 26 wherein a source of bromide ions is continuously or intermittently added to said circulating solution.

29. The process of claim 25 wherein the feed solution is a mixed halide solution containing both bromide ions and chloride ions.

* * * * *

UNITED STATES PATENT AND TRADEMARK OFFICE
CERTIFICATE OF CORRECTION

PATENT NO. : 5,385,650

DATED : January 31, 1995

INVENTOR(S) : Jonathan N. Howarth et al.

It is certified that error appears in the above-identified patent and that said Letters Patent is hereby corrected as shown below:

Column 26, claim 25, line 6, the following should be deleted:

"has been inserted after "solution," "

Signed and Sealed this

Fifteenth Day of August, 1995

Attest:

BRUCE LEHMAN

Attesting Officer

Commissioner of Patents and Trademarks